(12) United States Patent
Yang

(10) Patent No.: US 10,422,587 B2
(45) Date of Patent: Sep. 24, 2019

(54) VERTICAL FLUID HEAT EXCHANGER INSTALLED WITHIN NATURAL THERMAL ENERGY BODY

(76) Inventor: Tai-Her Yang, Dzan-Hwa (TW)

( * ) Notice: Subject to any disclaimer, the term of this patent is extended or adjusted under 35 U.S.C. 154(b) by 631 days.

(21) Appl. No.: 12/940,153

(22) Filed: Nov. 5, 2010

(65) Prior Publication Data

US 2011/0100587 A1    May 5, 2011

Related U.S. Application Data

(63) Continuation-in-part of application No. 12/591,024, filed on Nov. 5, 2009, now Pat. No. 9,587,890.

(51) Int. Cl.
*F28D 20/00* (2006.01)
*F24T 10/30* (2018.01)
*F28F 27/02* (2006.01)
*F24T 10/17* (2018.01)

(52) U.S. Cl.
CPC ......... *F28D 20/0034* (2013.01); *F24T 10/17* (2018.05); *F24T 10/30* (2018.05); *F28D 20/0052* (2013.01); *F28F 27/02* (2013.01); *F28D 2020/0078* (2013.01); *F28F 2250/06* (2013.01); *Y02E 10/125* (2013.01); *Y02E 60/142* (2013.01)

(58) Field of Classification Search
CPC ...... F24J 3/08; F24J 3/081; F24J 3/086; F24J 2003/087; F28D 20/0034; F28D 20/0052; F28D 2020/0078; F24T 10/30; F24T 10/17
USPC ............................................................ 165/45
See application file for complete search history.

(56) References Cited

U.S. PATENT DOCUMENTS

| | | | | |
|---|---|---|---|---|
| 3,874,174 A | * | 4/1975 | Greene | 60/641.2 |
| 4,010,731 A | * | 3/1977 | Harrison | F24J 3/06 |
| | | | | 126/400 |
| 4,138,995 A | * | 2/1979 | Yuan | 126/620 |
| 4,205,718 A | * | 6/1980 | Balch | 165/45 |
| 4,237,859 A | * | 12/1980 | Goettl | 126/400 |
| 4,257,239 A | * | 3/1981 | Partin et al. | 62/238.7 |
| 4,313,491 A | * | 2/1982 | Molitor | 165/83 |
| 4,375,831 A | * | 3/1983 | Downing, Jr. | 165/48.1 |
| 4,392,531 A | * | 7/1983 | Ippolito | 166/278 |
| 4,412,426 A | * | 11/1983 | Yuan | 62/260 |
| 4,489,568 A | * | 12/1984 | Shapess | 62/324.1 |
| 4,516,629 A | * | 5/1985 | Bingham | 165/45 |
| 4,566,532 A | * | 1/1986 | Basmajian | 165/45 |
| 4,628,696 A | * | 12/1986 | Rodgers | 62/79 |

(Continued)

FOREIGN PATENT DOCUMENTS

WO   WO 2009123458 A1 * 10/2009 .......... F24D 11/0221
WO   WO 2015159127 A1 * 10/2015 ............. E03F 11/00

*Primary Examiner* — Devon Russell
(74) *Attorney, Agent, or Firm* — Bacon & Thomas, PLLC

(57) ABSTRACT

The present invention relates to a vertical relay fluid storage barrel installed with fluid inlet and fluid outlet for whole or in part placement into natural thermal energy body in vertical or downward oblique manner, wherein a thermal energy exchanger is installed inside the relay fluid storage barrel temporarily storing thermal conductive fluid for external flow, the thermal energy exchanger is installed with fluid piping for the thermal conductive fluid passing through, to perform heat exchange with the fluid in the relay fluid storage barrel, and the fluid in the relay fluid storage barrel performs heat exchange with the natural thermal energy body.

33 Claims, 19 Drawing Sheets

(56) References Cited

U.S. PATENT DOCUMENTS

| | | | |
|---|---|---|---|
| 4,741,388 A * | 5/1988 | Kuroiwa | 165/45 |
| 4,993,483 A * | 2/1991 | Harris | 165/45 |
| 5,152,153 A * | 10/1992 | Hsiao | 62/260 |
| 5,322,115 A * | 6/1994 | Hildebrand | 165/45 |
| 5,758,514 A * | 6/1998 | Genung et al. | 62/471 |
| 6,041,862 A * | 3/2000 | Amerman | 166/290 |
| 6,112,544 A * | 9/2000 | Blatter et al. | 62/434 |
| 6,129,141 A * | 10/2000 | Yang | 165/45 |
| 6,142,215 A * | 11/2000 | Paulsen et al. | 165/45 |
| 6,212,896 B1 * | 4/2001 | Genung | 62/260 |
| 6,585,036 B2 * | 7/2003 | Amerman et al. | 165/45 |
| 6,615,601 B1 * | 9/2003 | Wiggs | 62/235.1 |
| 6,672,371 B1 * | 1/2004 | Amerman et al. | 165/45 |
| 6,860,320 B2 * | 3/2005 | Johnson et al. | 165/45 |
| 6,896,054 B2 * | 5/2005 | Mcclung, III | 166/246 |
| 6,931,879 B1 * | 8/2005 | Wiggs | 62/260 |
| 7,062,911 B2 * | 6/2006 | Yang | 60/641.6 |
| 7,128,156 B2 * | 10/2006 | McClung, III | 166/302 |
| 7,191,604 B1 * | 3/2007 | Wiggs | 62/89 |
| 7,234,314 B1 * | 6/2007 | Wiggs | F24J 2/04 165/45 |
| 7,377,122 B2 * | 5/2008 | Kidwell et al. | 62/260 |
| 7,451,612 B2 * | 11/2008 | Mueller et al. | 62/260 |
| 7,578,140 B1 * | 8/2009 | Wiggs | 62/260 |
| 7,584,610 B2 * | 9/2009 | Ziegenfuss | 60/398 |
| 7,591,145 B1 * | 9/2009 | Wiggs | 62/324.4 |
| 7,617,697 B2 * | 11/2009 | McCaughan | 62/260 |
| 7,647,773 B1 * | 1/2010 | Koenig | 60/641.2 |
| 7,832,220 B1 * | 11/2010 | Wiggs | 62/77 |
| 7,841,383 B2 * | 11/2010 | Wiggs | 165/45 |
| 7,856,839 B2 * | 12/2010 | Wiggs | 62/260 |
| 7,900,450 B2 * | 3/2011 | Gurin | 60/641.2 |
| 7,992,403 B2 * | 8/2011 | Kim et al. | 62/260 |
| 8,033,128 B2 * | 10/2011 | Giertz et al. | 62/260 |
| 8,047,275 B2 * | 11/2011 | Shim et al. | 165/297 |
| 8,082,751 B2 * | 12/2011 | Wiggs | 62/468 |
| 8,109,110 B2 * | 2/2012 | Wiggs | 62/260 |
| 8,161,759 B2 * | 4/2012 | Kidwell et al. | 62/115 |
| 8,282,017 B2 * | 10/2012 | Hawkins et al. | 237/2 A |
| 8,402,780 B2 * | 3/2013 | Wiggs | 62/192 |
| 8,468,842 B2 * | 6/2013 | Wiggs | 62/150 |
| 8,534,069 B2 * | 9/2013 | Parrella | 60/641.2 |
| 2004/0194909 A1 * | 10/2004 | Yang | 165/11.1 |
| 2005/0006049 A1 * | 1/2005 | Ross | 165/45 |
| 2007/0023164 A1 * | 2/2007 | Kidwell et al. | 165/45 |
| 2008/0121282 A1 * | 5/2008 | Green et al. | 137/3 |
| 2009/0133424 A1 * | 5/2009 | Wiggs | F25B 30/06 62/260 |

* cited by examiner

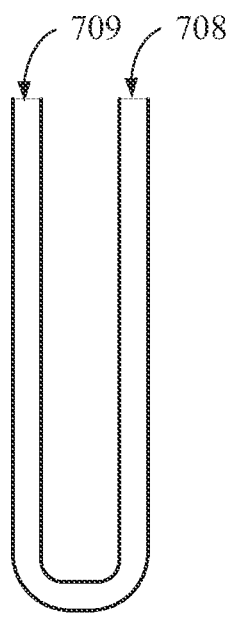
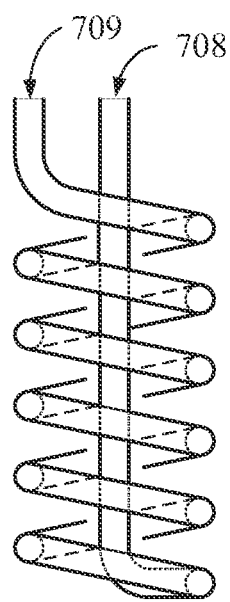
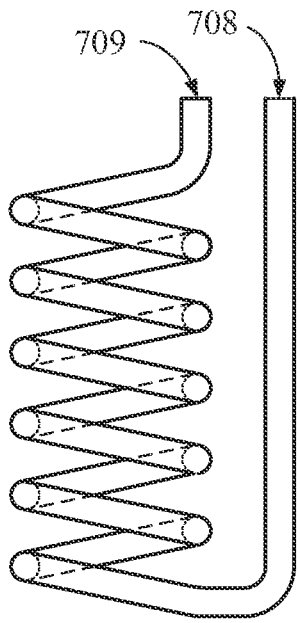
Fig. 3　　　　　Fig. 4　　　　　Fig. 5
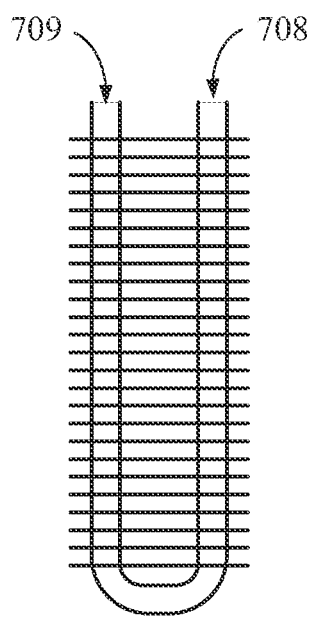
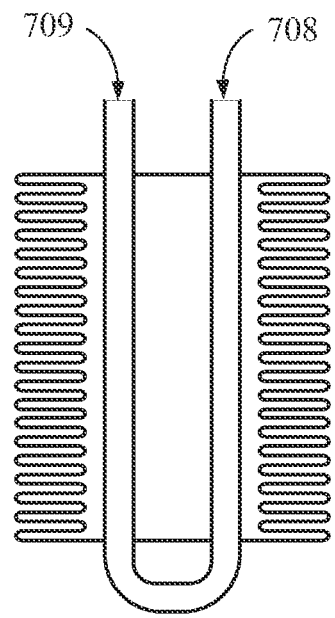
Fig. 6　　　　　Fig. 7

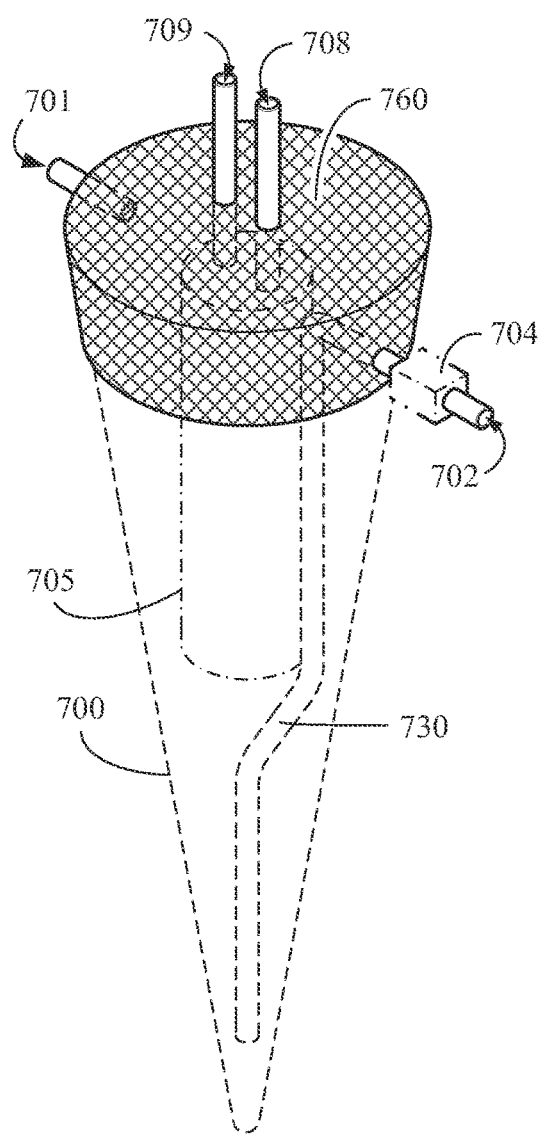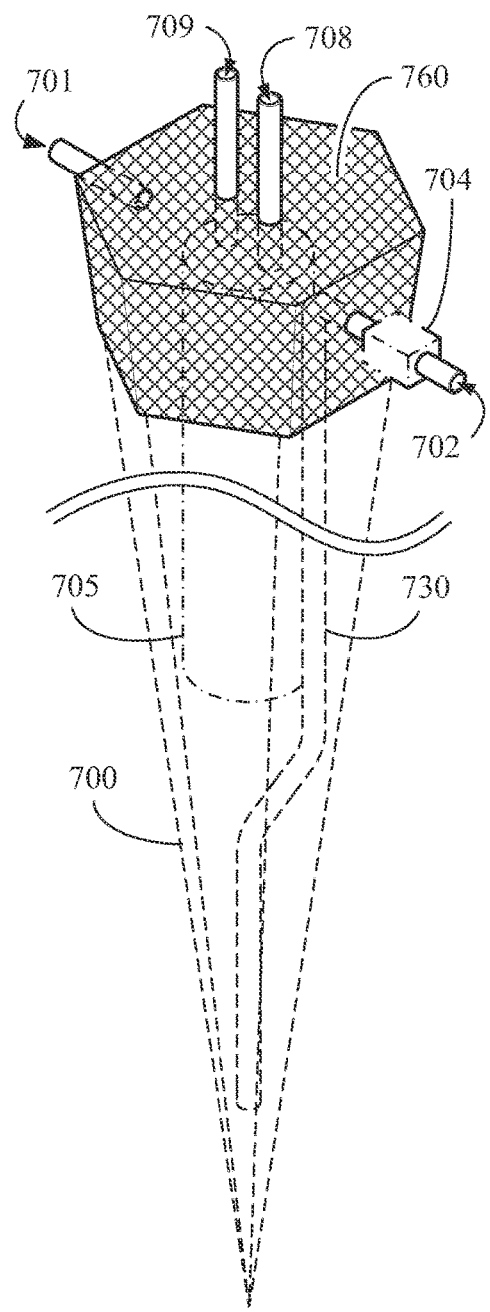
Fig. 32                    Fig. 33

US 10,422,587 B2

VERTICAL FLUID HEAT EXCHANGER INSTALLED WITHIN NATURAL THERMAL ENERGY BODY

CROSS-REFERENCE TO RELATED APPLICATION

This application is a Continuation-In-Part of my patent application Ser. No. 12/591,024, filed on Nov. 5, 2009.

BACKGROUND OF THE INVENTION (a) Field of the Invention

The present invention relates to a fluid heat exchanger with the form of vertical relay fluid storage barrel installed with at least one fluid inlet and at least one fluid outlet for being close installed, or whole or in part placement into natural thermal energy body in vertical or downward oblique manner, wherein a thermal energy exchanger is installed inside the structure of the relay fluid storage barrel temporarily storing thermal conductive fluid for external flow, such as tap-water, or water from rivers, lakes or sea, for performing the function of auxiliary water storage barrel installed at shallow thermal energy body, the thermal energy exchanger is installed with at least one fluid piping for the thermal conductive fluid passing through, to perform heat exchange with the fluid in the relay fluid storage barrel, and the fluid in the relay fluid storage barrel performs heat exchange with the thermal energy of the natural thermal energy body, such as soil of shallow surface of the earth, or lakes, rivers, or sea, or artificial fluid storage facilities of ponds, reservoirs, or fluid pools.

(b) Description of the Prior Art

The conventional embedded vertical relay fluid storage barrel installed at natural thermal energy body, such as soil of shallow surface of the earth, or lakes, rivers, or sea, or artificial fluid storage facilities of ponds, reservoirs, or fluid pools, is usually constituted by rod structure in solid, and only the rod structural body performs heat exchange through transmitting thermal energy of the natural thermal energy body to fluid piping installed inside the rod structural body with the shortages of small value and slow speed of heat exchange.

SUMMARY OF THE INVENTION

The present invention relates to a fluid heat exchanger with the form of vertical relay fluid storage barrel for being close installed, or whole or in part placement into natural thermal energy body installed in soil of shallow surface of the earth, or lakes, rivers, or sea, or artificial fluid storage facilities of ponds, reservoirs, or fluid pools, in vertical or downward oblique manner, wherein the relay fluid storage barrel is installed with at least one fluid inlet and at least one fluid outlet, a thermal energy exchanger is installed inside the structure of the relay fluid storage barrel temporarily storing thermal conductive fluid for external flow, such as tap-water, or water from rivers, lakes or sea, for performing the function of auxiliary water storage barrel installed at shallow thermal energy body, the thermal energy exchanger is installed with at least one fluid piping for the thermal conductive fluid passing through, to perform heat exchange with the fluid in the relay fluid storage barrel, and the fluid in the relay fluid storage barrel performs heat exchange with the thermal energy of the natural thermal energy body, such as soil of shallow surface of the earth, or lakes, rivers, or sea, or artificial fluid storage facilities of ponds, reservoirs, or fluid pools; the thermal conductive fluid in the relay fluid storage barrel, such as tap-water, or water from rivers, lakes or sea, can be randomly pumped to form an open flow path system, or the system can be kept random pumping facilities and be additionally installed with pumps (including a common pump and making choice of pumped fluid flow by a switch valve), to pump the thermal conductive fluid in the relay fluid storage barrel to the source of the thermal conductive fluid to form a semi-open flow path system, or the system can be only installed with pumps, but without random pumping facilities, to pump the thermal conductive fluid in the relay fluid storage barrel to the upstream source of the thermal conductive fluid to form a closed flow path system.

BRIEF DESCRIPTION OF THE DRAWINGS

FIG. 3 is a structural schematic view of an embodiment, showing a thermal energy exchanger (705) constituted by U-type piping, according to the present invention;

FIG. 4 is a structural schematic view of an embodiment, showing the thermal energy exchanger (705) constituted by spiral piping, according to the present invention;

FIG. 5 is a structural schematic view of an embodiment, showing the thermal energy exchanger (705) constituted by wavy piping, according to the present invention;

FIG. 6 is a structural schematic view of an embodiment, showing the thermal energy exchanger (705) constituted by U-type piping additionally installed with thermal conductive fins, according to the present invention;

FIG. 7 is a structural schematic view of an embodiment, showing the thermal energy exchanger (705) constituted by a thermal conductive structural body inside installed with flow paths, according to the present invention;

FIGS. 12A and 12B respectively show series and parallel connections of the energy exchanger fluid pathways shown in FIG. 12.

FIG. 32 is a structural schematic view of an embodiment, showing the relay fluid storage barrel (700) is formed to a cone shape;

FIG. 33 is a structural schematic view of an embodiment, showing the relay fluid storage barrel (700) is formed to a reverse taper shape three-dimension polyhedron;

Figure 1:
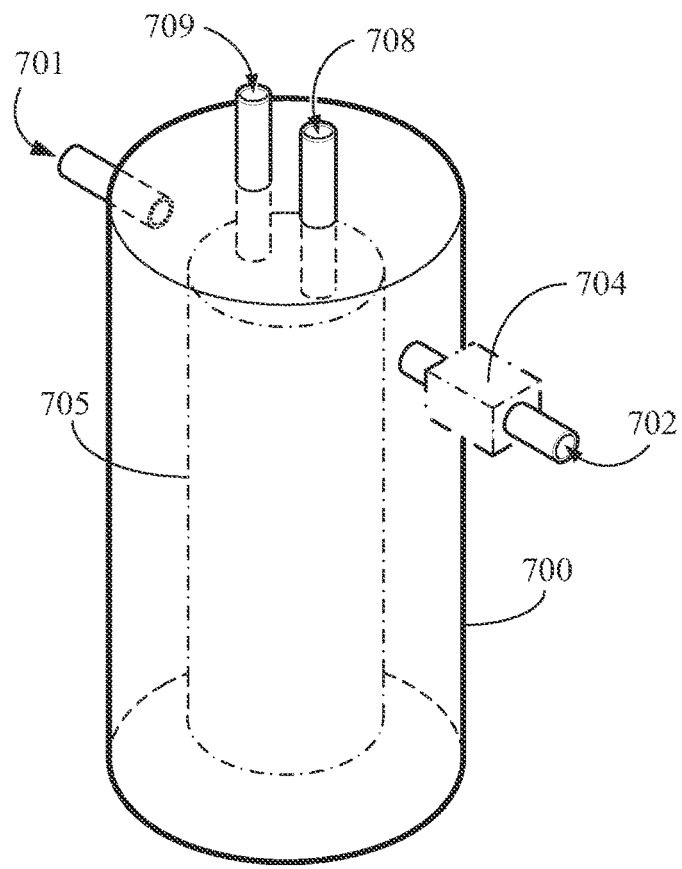
FIG. 1 is a three-dimensional schematic view showing the basic structure of the present invention.

DESCRIPTION OF MAIN COMPONENT SYMBOLS (700): Relay fluid storage barrel
(701), (708), (708'): Fluid inlet
(702), (709), (709'): Fluid outlet
(702'): Backflow fluid outlet
(703): Switch valve
(704), (714), (724): Pump
(705): Thermal energy exchanger
(710), (801), (802): Controllable valve
(720): Ventilation piping
(723): Fluid port
(725): Ventilation switch valve
(730), (730'): Flow guiding structure for guiding the flow of internal fluid to flow from top to bottom
(750): Backflow piping
(760): Heat insulation member
(800): With-flow piping
(810): Fluid piping
(820), (830): Auxiliary fluid piping
(850): Secondary segment fluid storage facilities
(900): Fluid source
(1000): Natural thermal energy body
(1100): Gantry structure
(1200): Cooling tower
(1201): High temperature water inlet
(1202): Cooling water outlet
(1500): Air-conditioning device
(2000): Control device
(3000): External conduit (7001): Bottom portion of relay fluid storage barrel
(7050): Combined thermal energy exchanger

DETAILED DESCRIPTION OF THE PREFERRED EMBODIMENTS

The conventional embedded vertical relay fluid storage barrel installed at natural thermal energy body, such as soil of shallow surface of the earth, or lakes, rivers, or sea, or artificial fluid storage facilities of ponds, reservoirs, or fluid pools, is usually constituted by rod structure in solid, and only the rod structural body performs heat exchange through transmitting thermal energy of the natural thermal energy body to fluid piping installed inside the rod structural body with the shortages of small value and slow speed of heat exchange.

The present invention relates to a vertical fluid heat exchanger installed within natural thermal energy body, mainly to a fluid heat exchanger with the form of vertical relay fluid storage barrel for being close installed, or whole or in part placement into natural thermal energy body installed in soil of shallow surface of the earth, or lakes, rivers, or sea, or artificial fluid storage facilities of ponds, reservoirs, or fluid pools, in vertical or downward oblique manner, wherein the relay fluid storage barrel is installed with at least one fluid inlet and at least one fluid outlet, a thermal energy exchanger is installed inside the structure of the relay fluid storage barrel temporarily storing thermal conductive fluid for external flow, such as tap-water, or water from rivers, lakes or sea, for performing the function of auxiliary water storage barrel installed at shallow thermal energy body, the thermal energy exchanger is installed with at least one fluid piping for the thermal conductive fluid passing through, to perform heat exchange with the fluid in the relay fluid storage barrel, and the fluid in the relay fluid storage barrel performs heat exchange with the thermal energy of the natural thermal energy body, such as soil of shallow surface of the earth, or lakes, rivers, or sea, or artificial fluid storage facilities of ponds, reservoirs, or fluid pools; the thermal conductive fluid in the relay fluid storage barrel, such as tap-water, or water from rivers, lakes or sea, can be randomly pumped to form an open flow path system, or the system can be kept random pumping facilities and be additionally installed with pumps (including a common pump and making choice of pumped fluid flow by a switch valve), to pump the thermal conductive fluid in the relay fluid storage barrel to the source of the thermal conductive fluid to form a semi-open flow path system, or the system can be only installed with pumps, but without random pumping facilities, to pump the thermal conductive fluid in the relay fluid storage barrel to the upstream source of the thermal conductive fluid to form a closed flow path system.

Figure 2:
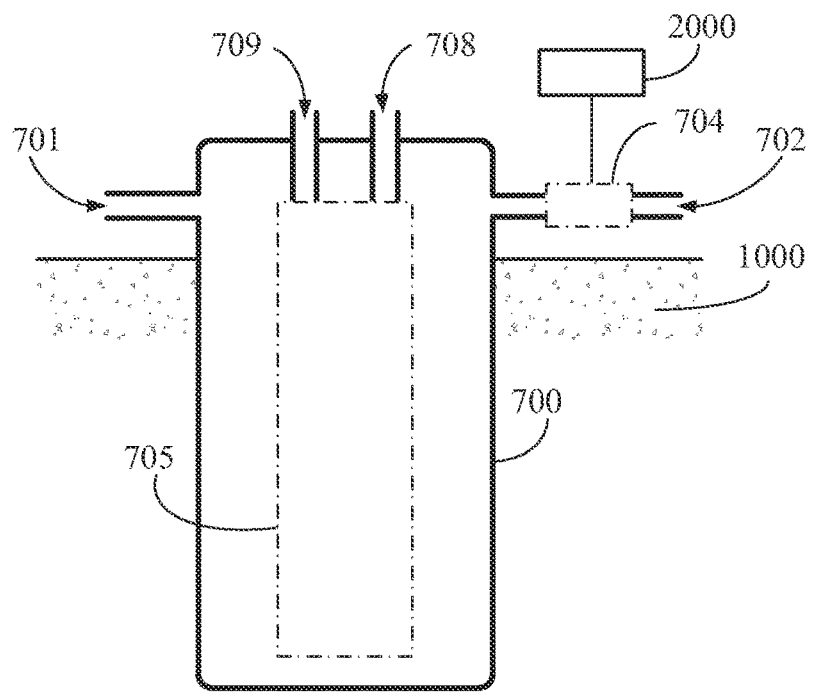
FIG. 2 is a sectional view of FIG. 1.

For the vertical fluid heat exchanger installed within natural thermal energy body, the basic structure and operation are explained as following:

FIG. 1 is a three-dimensional schematic view showing the basic structure of the present invention, and FIG. 2 is a sectional view of FIG. 1. As shown in FIG. 1 and FIG. 2, the main components include:

Relay fluid storage barrel (700): made of thermal conductive material to be integrated or combined, wherein the relay fluid storage barrel (700) is a fluid heat exchanger with the form of vertical relay fluid storage barrel for being close installed, or whole or in part placement into natural thermal energy body (1000) in vertical or downward oblique manner, and the relay fluid storage barrel (700) is installed with at least one fluid inlet (701) and at least one fluid outlet (702) for fluid entering and leaving to perform fluid exchange function; in which the fluid inlet (701) is installed at the position lower than that of the relay fluid storage barrel (700), and the fluid outlet (702) is installed at the position higher than that of the relay fluid storage barrel (700), or vice versa, to prevent the fluid at lower part within the relay fluid storage barrel (700) from stagnation; and wherein the fluid passing through the relay fluid storage barrel (700) is controlled by human or by control device (2000) for pumping or pump-priming, by way of external pressure, or gravity with potential difference, or a pump (704) being installed at the fluid inlet (701) and/or the fluid outlet (702), to drive the fluid in liquid state, or gaseous state, or liquid to gaseous state, or gaseous to liquid state for pumping, or stop, or adjustment of pumping flow rate;

one or more thermal energy exchangers (705) related to fluid by fluid are installed inside the relay fluid storage barrel (700);

the thermal energy exchanger (705) has independent flow paths for fluid passing through, to perform heat exchange with the fluid in the relay fluid storage barrel (700); the thermal energy exchanger (705) is directly constituted by the structure of tubular flow paths in a variety of geometric shapes, including U-type fluid piping (such as FIG. 3 is a structural schematic view of an embodiment, showing the thermal energy exchanger (705) constituted by U-type piping, according to the present invention), or spiral fluid piping (such as FIG. 4 is a structural schematic view of an embodiment, showing the thermal energy exchanger (705) constituted by spiral piping, according to the present invention), or wavy fluid piping (such as FIG. 5 is a structural schematic view of an embodiment, showing the thermal energy exchanger (705) constituted by wavy piping, according to the present invention), and/or the thermal energy exchanger (705) is constituted by U-type piping additionally installed with thermal conductive fins (such as FIG. 6 is a structural schematic view of an embodiment, showing the thermal energy exchanger (705) constituted by U-type piping additionally installed with thermal conductive fins, according to the present invention), and the above thermal energy exchangers (705) in various shapes are installed with fluid inlet (708) and fluid outlet (709);

the thermal energy exchanger (705) is directly constituted by a thermal conductive structural body inside installed with flow paths and installed with the fluid inlet (708) and the fluid outlet (709), and/or thermal conductive fins extended from the thermal conductive structural body (such as FIG. 7 is a structural schematic view of an embodiment, showing the thermal energy exchanger (705) constituted by a thermal conductive structural body inside installed with flow paths, according to the present invention);

the individual fluid pathway of the thermal energy exchanger (705) is installed with fluid inlet and fluid outlet; and the fluid passing through the fluid pathway of the thermal energy exchanger (705) is controlled for pumping or pump-priming, by way of external pressure, or gravity with potential difference, or a pump being installed, to individually drive the same or different fluid in liquid state, or gaseous state, or liquid to gaseous state, or gaseous to liquid state; and Control device (2000): related to control device activated by electrical force, mechanical force, current force, or magnetic force, for controlling the pump (704), wherein the control device (2000) and the pump (704) are installed simultaneously.

For the vertical fluid heat exchanger installed within natural thermal energy body, there are one or more cylindrical relay fluid storage barrels (700) inside installed with the thermal energy exchanger (705), and if two or more relay fluid storage barrels (700) exist, the fluid pathways in the individual relay fluid storage barrel (700) are series connection, parallel connection, or series-parallel connection; wherein the different relay fluid storage barrels (700) individually operate for same or different types fluids passing through;

there are one or divided into more than one fluid pathways within the relay fluid storage barrel (700), and if divided into two or more fluid pathways exist, individual flow path is installed with fluid inlet and fluid outlet;

if there are two or more fluid pathways within the relay fluid storage barrel (700), individual fluid pathway individually operates for same or different types fluids passing through; and if there are two or more fluid pathways within the relay fluid storage barrel (700), the fluid pathways are series connection, parallel connection, or series-parallel connection.

For the vertical fluid heat exchanger installed within natural thermal energy body, the thermal energy exchanger (705) is directly constituted by at least two crossed U-type fluid piping, in which one fluid pathway is installed with the fluid inlet (708) and the fluid outlet (709), and another fluid pathway is installed with fluid inlet (708') and fluid outlet (709').

Figure 8:
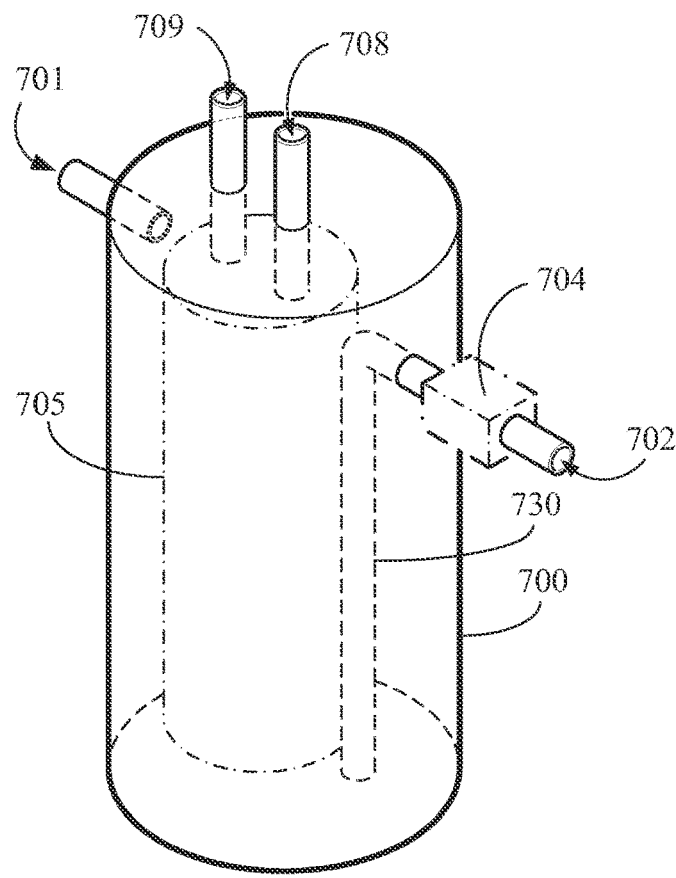
FIG. 8 is a structural schematic view of an embodiment, showing that a fluid inlet (701) and a fluid outlet (702) are placed at upper part in a relay fluid storage barrel (700), wherein flow guiding structure (730) for guiding the flow of internal fluid to flow from top to bottom is placed inside the relay fluid storage barrel (700) to connect the fluid inlet (701) and/or the fluid outlet (702), according to the present invention.
Figure 9:
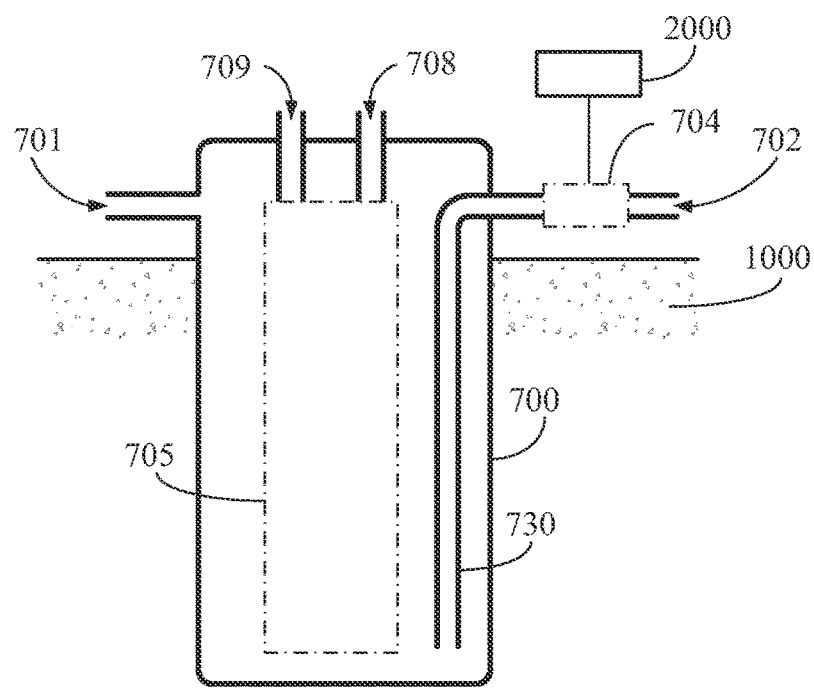
FIG. 9 is a sectional view of FIG. 8.
Figure 10:
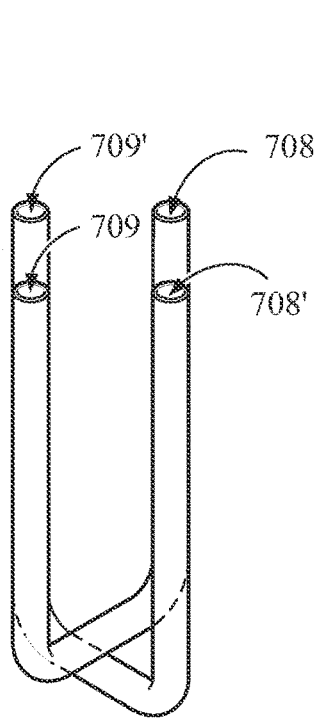
FIG. 10 is a structural schematic view of an embodiment, showing that a combined thermal energy exchanger (7050) is constituted by two crossed U-type piping with 90 degrees difference, according to the present invention.
Figure 11:
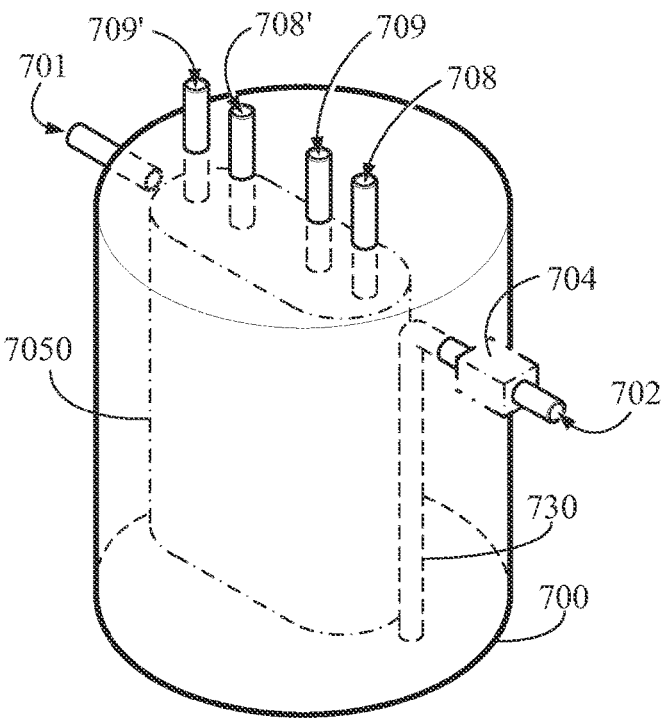
FIG. 11 is a structural schematic view of an embodiment, showing that the same combined thermal energy exchanger (7050) within the relay fluid storage barrel (700) is installed with two fluid pathways, according to the present invention.
Figure 12:
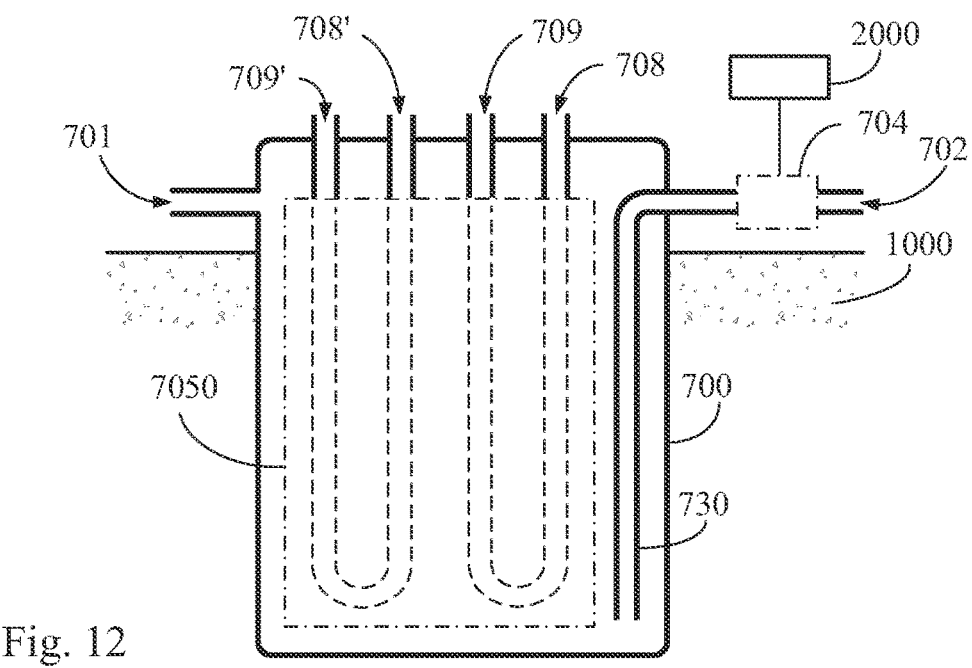
FIG. 12 is a sectional view of FIG. 11.
Figure 12:
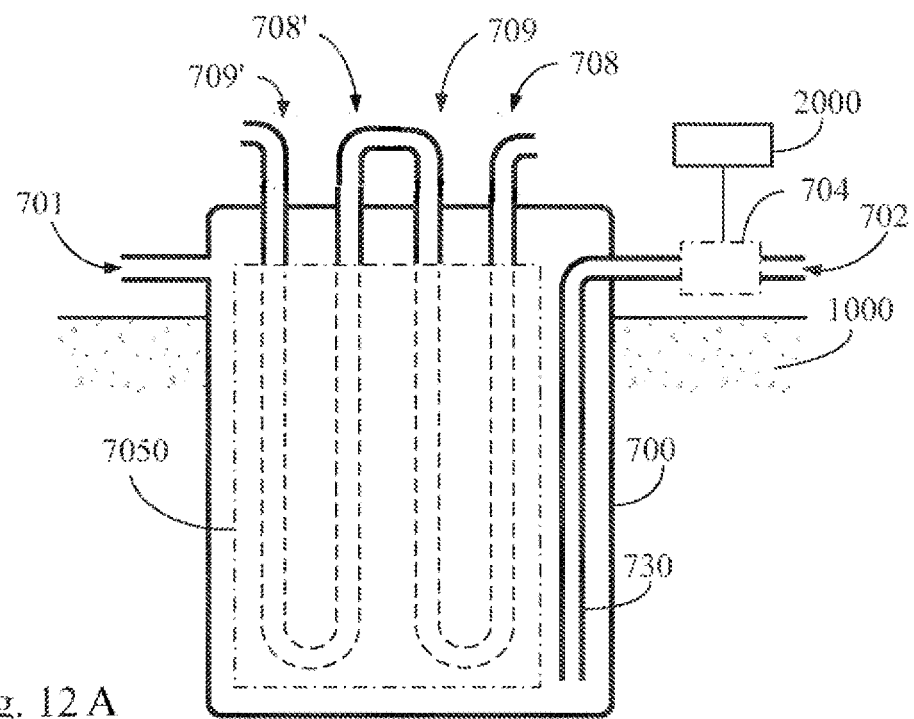
Figure 12:
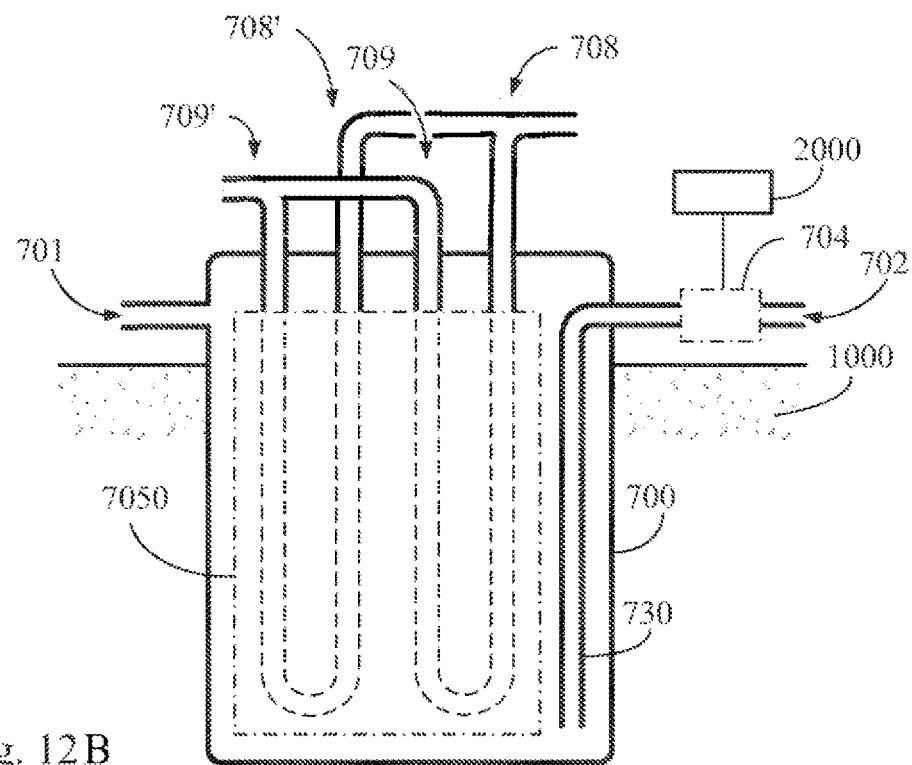
Figure 13:
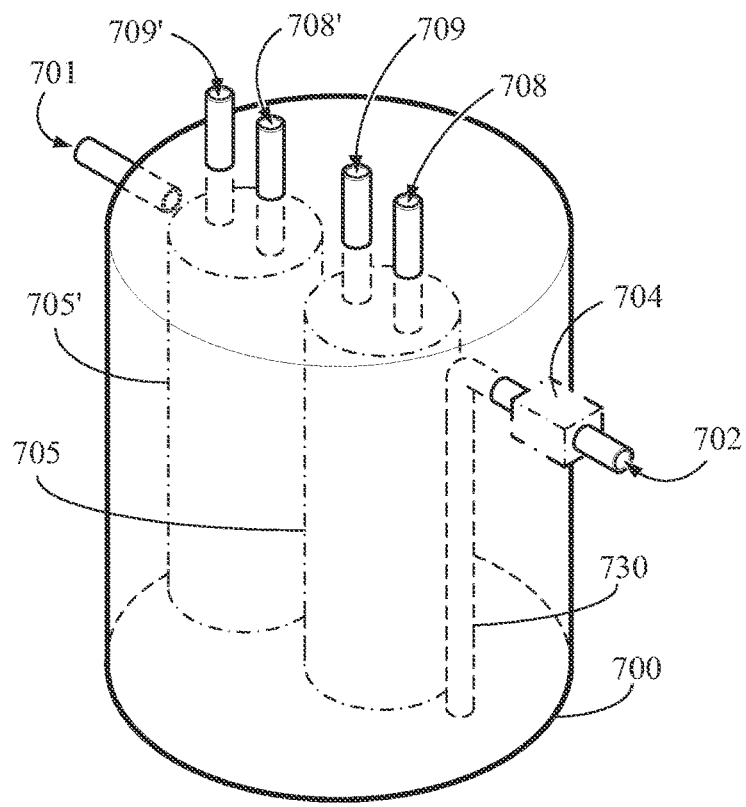
FIG. 13 is a structural schematic view of an embodiment, showing that two or more thermal energy exchangers (705) are installed within the same relay fluid storage barrel (700), according to the present invention.
Figure 14:
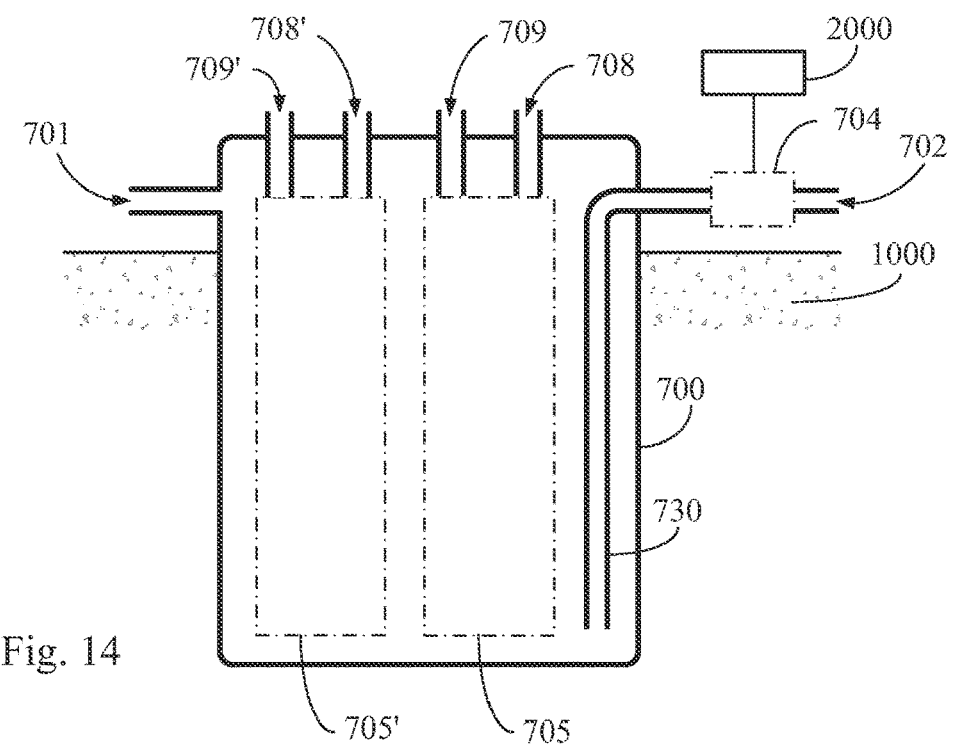
FIG. 14 is a sectional view of FIG. 13.

For the vertical fluid heat exchanger installed within natural thermal energy body, the fluid inlet (701) and the fluid outlet (702) are further installed at upper part within the relay fluid storage barrel (700) to facilitate maintenance, and flow guiding structure (730) for guiding the flow of internal fluid to flow from top to bottom is placed inside the relay fluid storage barrel (700) to connect the fluid inlet (701) and/or the fluid outlet (702), for ensuring the flow path between the fluid inlet (701) and the fluid outlet (702) passing through the bottom of the relay fluid storage barrel (700) to prevent the fluid at lower part within the relay fluid storage barrel (700) from stagnation; (such as FIG. 8 is a structural schematic view of an embodiment, showing that a fluid inlet (701) and a fluid outlet (702) are placed at upper part in a relay fluid storage barrel (700), wherein the flow guiding structure (730) for guiding the flow of internal fluid to flow from top to bottom is placed inside the relay fluid storage barrel (700) to connect the fluid inlet (701) and/or the fluid outlet (702), according to the present invention; and FIG. 9 is a sectional view of FIG. 8); wherein the fluid pathways of the same combined thermal energy exchanger (7050) in the same relay fluid storage barrel (700) include two or more U-type piping, which are parallel and side by side, parallel and stacked, or crossed with angle difference, (such as FIG. 10 is a structural schematic view of an embodiment, showing that the combined thermal energy exchanger (7050) is constituted by two crossed U-type piping with 90 degrees difference, according to the present invention) and if two or more fluid pathways exist, individual fluid pathway is installed with fluid inlet and fluid outlet, and individually operates for same or different types fluids passing through; (such as FIG. 11 is a structural schematic view of an embodiment, showing that the same combined thermal energy exchanger (7050) within the relay fluid storage barrel (700) is installed with two fluid pathways, according to the present invention; and FIG. 12 is a sectional view of FIG. 11) and if there are two or more fluid pathways of the same combined thermal energy exchanger (7050) in the same relay fluid storage barrel (700), the fluid pathways are series connection, parallel connection, or series-parallel connection;

if two or more thermal energy exchangers (705) are installed within the same relay fluid storage barrel (700), the individual thermal energy exchanger (705) includes one or more fluid pathways respectively installed with fluid inlet and fluid outlet, and individual fluid pathway individually operates for same or different types fluids passing through; (such as FIG. 13 is a structural schematic view of an embodiment, showing that two or more thermal energy exchangers (705) are installed within the same relay fluid storage barrel (700), according to the present invention; and FIG. 14 is a sectional view of FIG. 13);

if there are two or more thermal energy exchangers (705) installed inside the same relay fluid storage barrel (700), the fluid pathways of the individual thermal energy exchanger (705) are series connection, parallel connection, or series-parallel connection;

the fluid pathways of the thermal energy exchangers (705) installed within the different relay fluid storage barrels (700) individually operate;

same or different types fluids pass through the individual fluid pathway of the thermal energy exchangers (705) within the different relay fluid storage barrels (700);

the fluid pathways of the thermal energy exchangers (705) within the different relay fluid storage barrels (700) are series connection, parallel connection, or series-parallel connection; and the fluids passing through the piping of the thermal energy exchangers (705) within the different relay fluid storage barrels (700) are controlled by human or by the control device (2000) for pumping or pump-priming, by way of external pressure, or gravity with potential difference, or the pump (714) being installed, to drive the fluids in liquid state, or gaseous state, or liquid to gaseous state, or gaseous to liquid state.

Figure 15:
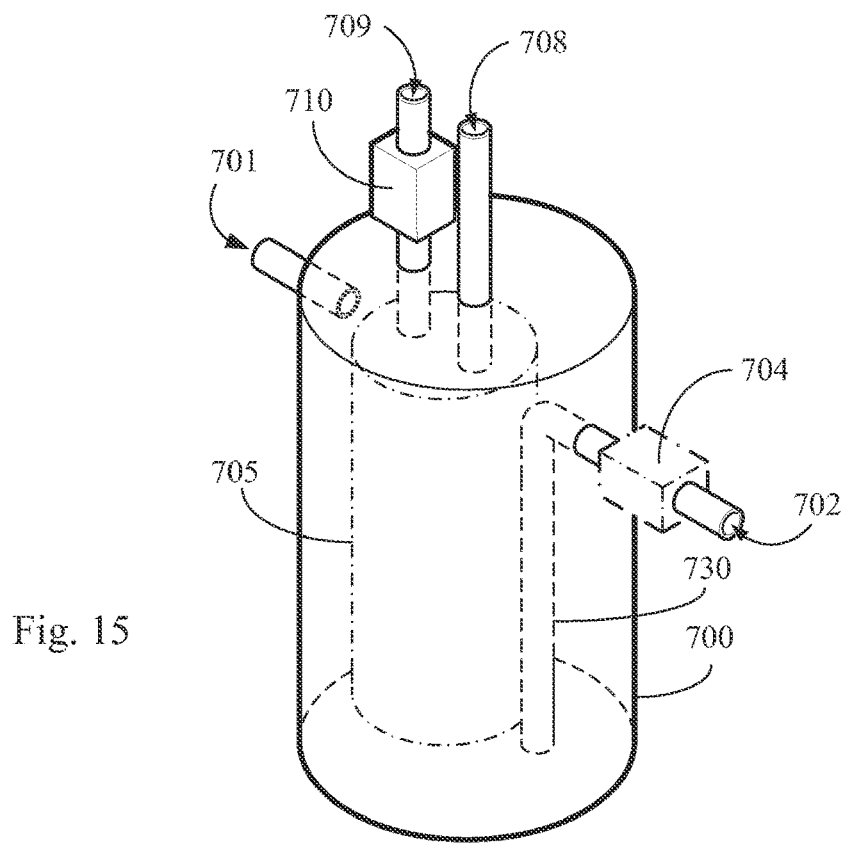
FIG. 15 is a structural schematic view of an embodiment, showing that a fluid inlet (708) and/or a fluid outlet (709) of the fluid pathway in the thermal energy exchanger (705) are installed with a switch valve (710), according to the present invention.
Figure 16:
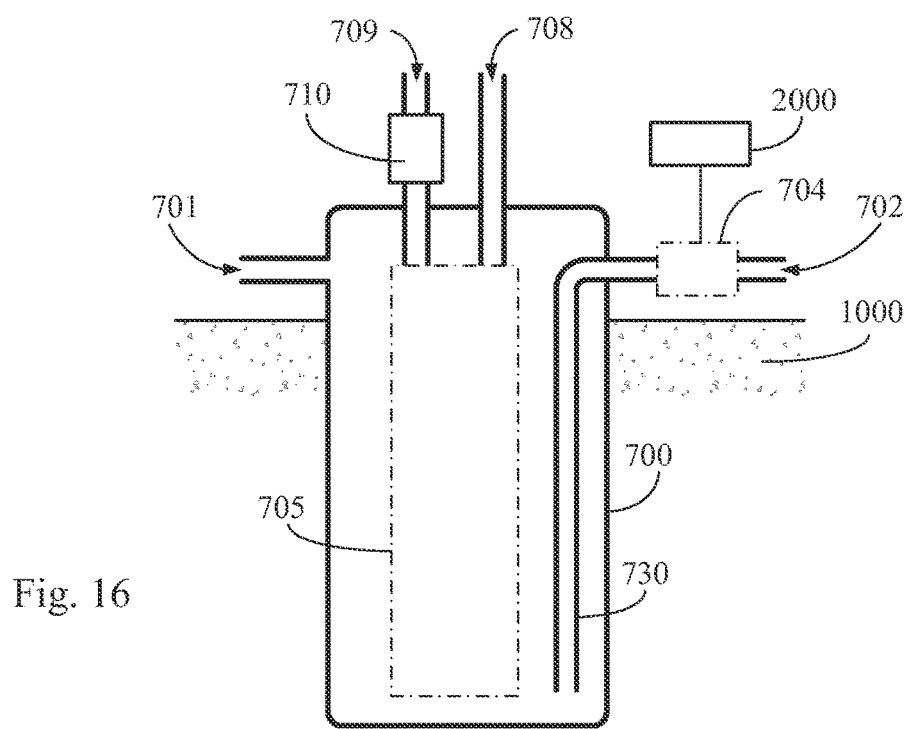
FIG. 16 is a sectional view of FIG. 15.

For the above thermal energy exchanger (705), the fluid inlet (708) and/or the fluid outlet (709) of the fluid pathway are installed with a switch valve (710) (such as FIG. 15 is a structural schematic view of an embodiment, showing that the fluid inlet (708) and/or the fluid outlet (709) of the fluid pathway in the thermal energy exchanger (705) are installed with the switch valve (710), according to the present invention; and FIG. 16 is a sectional view of FIG. 15).

As shown in FIG. 15 and FIG. 16, the fluid inlet (708) and/or the fluid outlet (709) of the fluid pathway in the thermal energy exchanger (705) are installed with the controllable valve (710) for control regulation of the fluid entering the fluid pathway in the thermal energy exchanger (705).

For the vertical fluid heat exchanger installed within natural thermal energy body, the barrel cross-section shapes of the relay fluid storage barrels (700) include circular, oval, star, or other shapes.

The shapes of the relay fluid storage barrels (700) include parallel rods or non-parallel rods.

Figure 17:
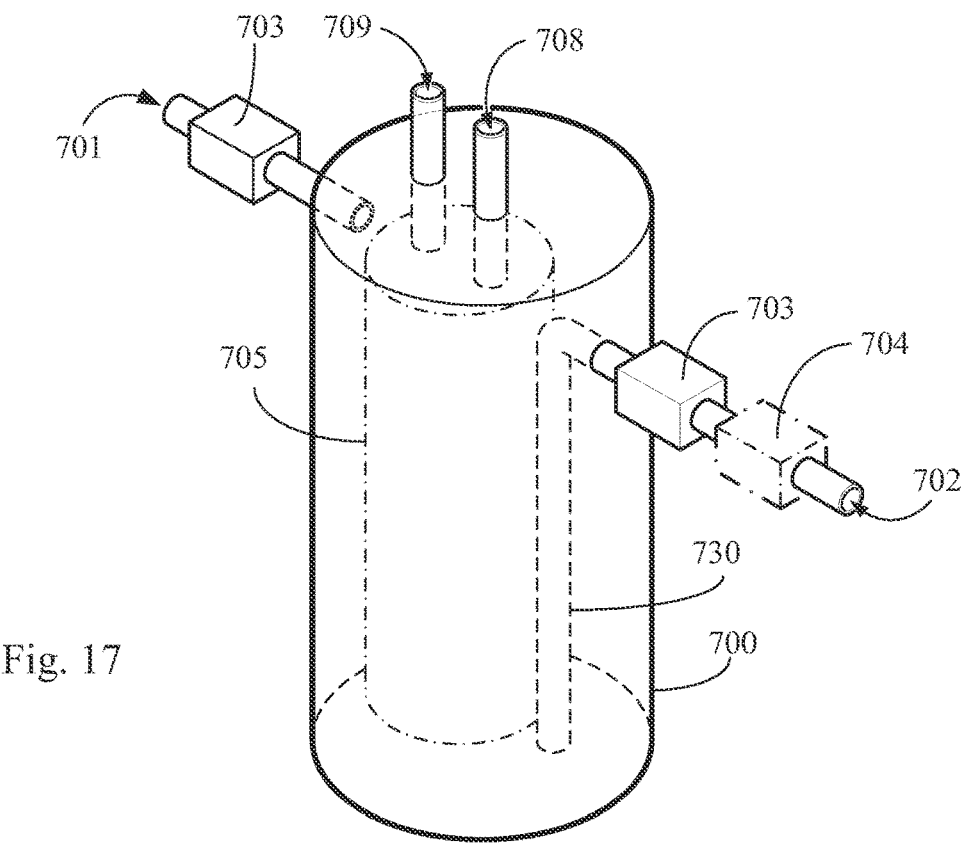
FIG. 17 is a structural schematic view of an embodiment, showing that the fluid inlet (701) and/or the fluid outlet (702) of the relay fluid storage barrel (700) are installed with a switch valve (703), according to the present invention.
Figure 18:
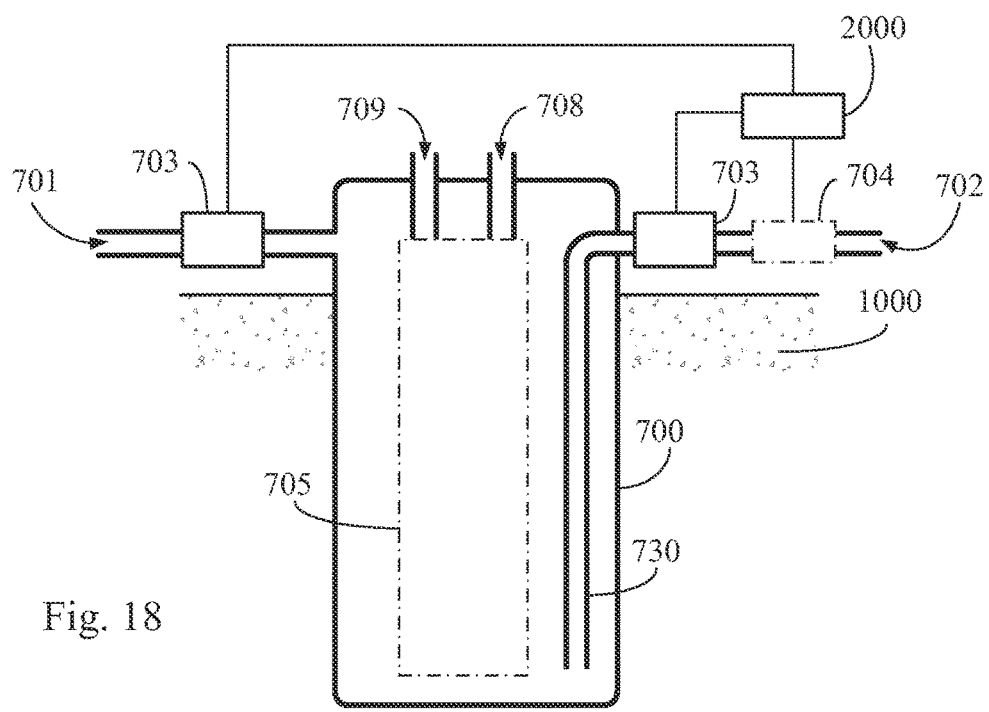
FIG. 18 is a sectional view of FIG. 17.

For the relay fluid storage barrels (700), the fluid inlet (701) and/or the fluid outlet (702) are installed with a switch valve (703) to control the switch valve (703) by human or by the control device (2000) for opening, or closing, or adjustment of flow rate, and to control the pump (704) for pumping, or stop, or adjustment of pumping flow rate; the control device (2000) is control device activated by electrical force, mechanical force, current force, or magnetic force (such as FIG. 17 is a structural schematic view of an embodiment, showing that the fluid inlet (701) and/or the fluid outlet (702) of the relay fluid storage barrel (700) are installed with the switch valve (703), according to the present invention; and FIG. 18 is a sectional view of FIG. 17).

Figure 19:
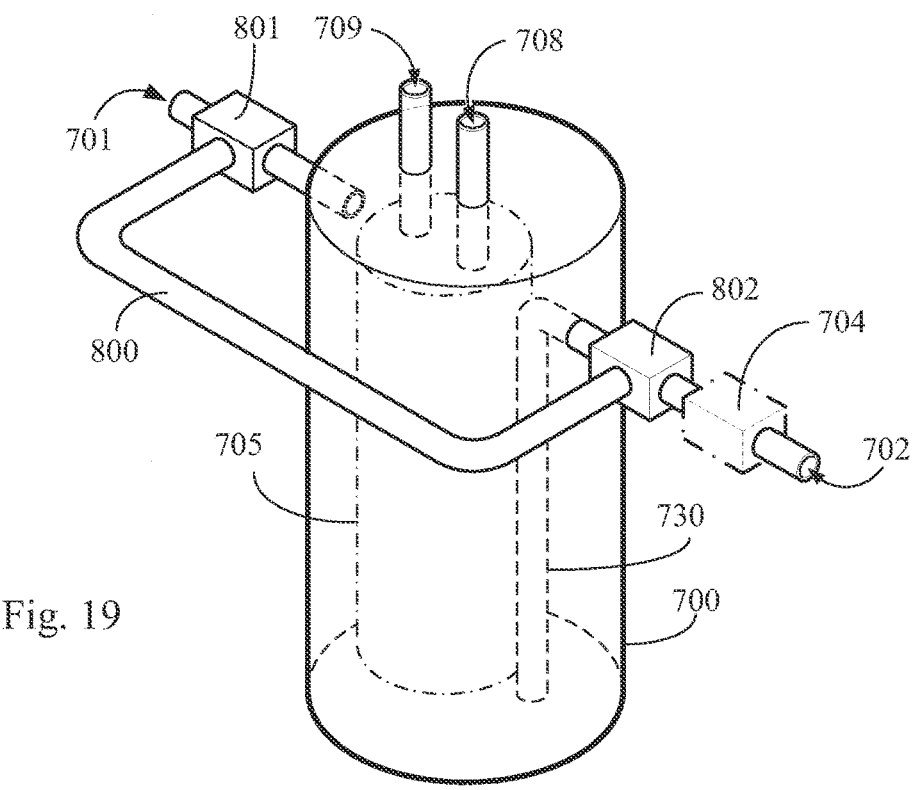
FIG. 19 is a structural schematic view of an embodiment, showing that a controllable valve (801) is installed at the fluid inlet (701) and/or a controllable valve (802) is installed at the fluid outlet (702), and with-flow piping (800) is installed between the controllable valve (801) and the controllable valve (802), within the relay fluid storage barrel (700), according to the present invention.
Figure 20:
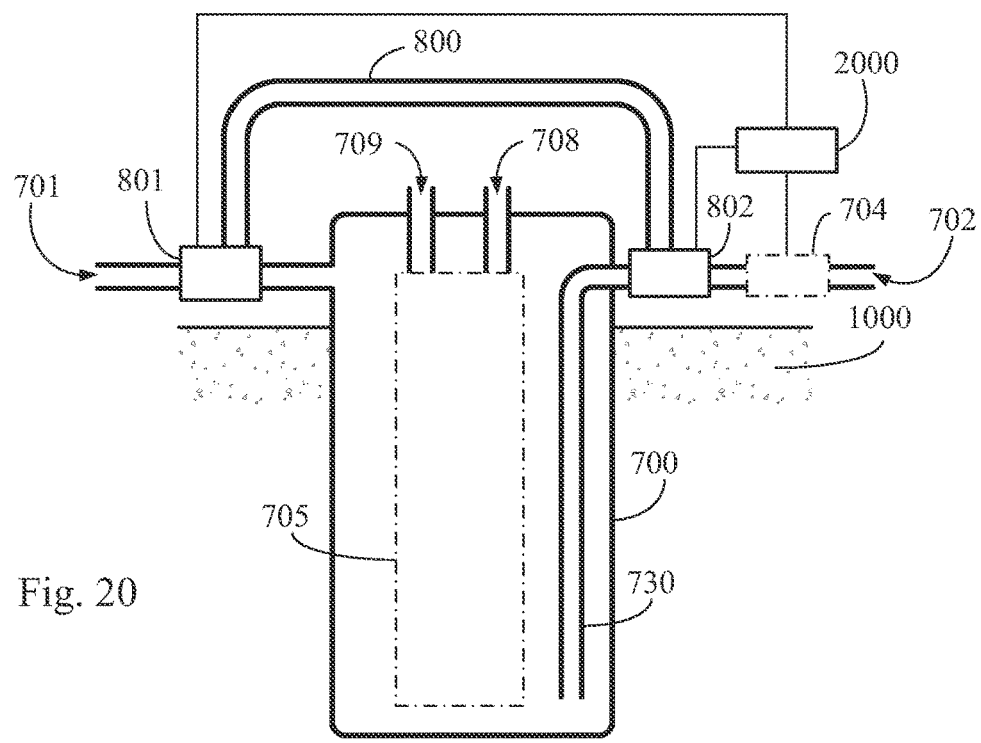
FIG. 20 is a sectional view of FIG. 19.

For the relay fluid storage barrels (700), a controllable valve (801) is installed at the fluid inlet (701) and/or a controllable valve (802) is installed at the fluid outlet (702), and with-flow piping (800) is installed between the controllable valve (801) and the controllable valve (802) to regulate the fluid flow rate entering inside the relay fluid storage barrels (700), by way of adjustment of the fluid flow rate passing through the with-flow piping, to control the controllable valve (801) and/or the controllable valve (802) by human or by the control device (2000) for opening, or closing, or adjustment of flow rate, and to control the pump (704) for pumping, or stop, or adjustment of pumping flow rate; the control device (2000) is control device activated by electrical force, mechanical force, current force, or magnetic force (such as FIG. 19 is a structural schematic view of an embodiment, showing that the controllable valve (801) is installed at the fluid inlet (701) and/or the controllable valve (802) is installed at the fluid outlet (702), and the with-flow piping (800) is installed between the controllable valve (801) and the controllable valve (802), within the relay fluid storage barrel (700), according to the present invention; and FIG. 20 is a sectional view of FIG. 19).

As shown in FIG. 19 and FIG. 20, the controllable valves (801) and (802) and the with-flow piping (800) are controlled for one or more flow modes as following, including:
1) blocking the fluid passing through the with-flow piping (800), and then the fluid completely passing through the relay fluid storage barrel (700) for entering or leaving;
2) blocking the fluid entering into the relay fluid storage barrel (700), and then the fluid completely passing through the with-flow piping (800);
3) partial fluid entering into the relay fluid storage barrel (700), and partial fluid passing through the with-flow piping (800); and
4) adjusting the fluid flow rate entering into the relay fluid storage barrel (700), for performing the functions of opening and closing.

For the vertical fluid heat exchanger installed within natural thermal energy body, the relay fluid storage barrel (700) and/or the thermal energy exchanger (705) are constituted by integrated or combined structure to facilitate the dismantling and maintenance.

The structural cross-section shapes of the thermal energy exchanger (705) include circular, oval, star, square, or other shapes.

The shapes of the thermal energy exchanger (705) include parallel rods or non-parallel rods.

Figure 21:
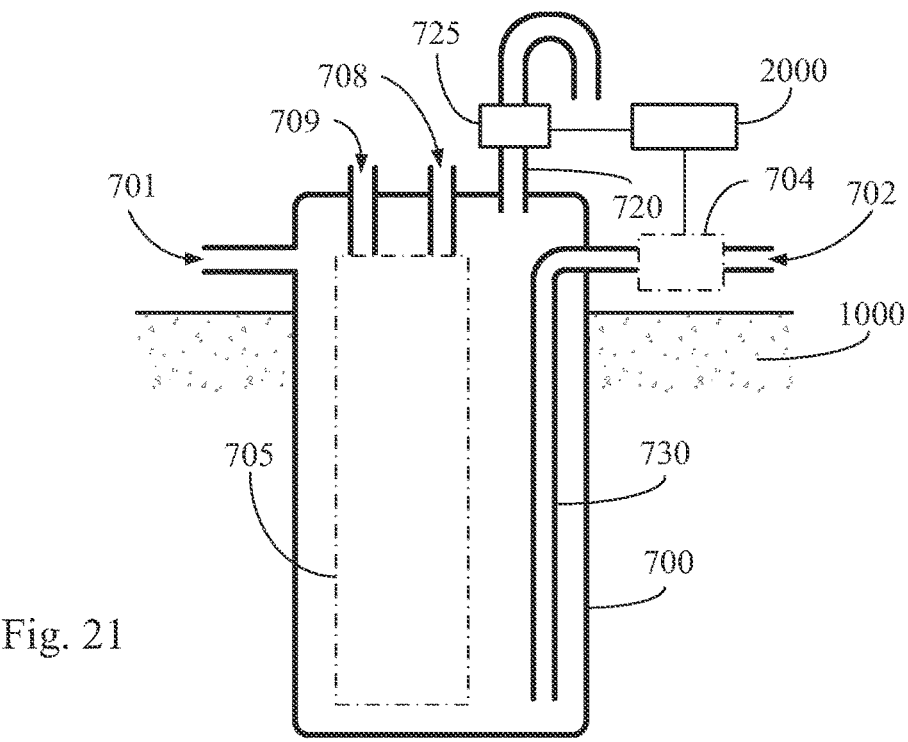
FIG. 21 is a structural schematic view of an embodiment, showing that the relay fluid storage barrel (700) is further installed with ventilation piping (720), according to the present invention.

For the vertical fluid heat exchanger installed within natural thermal energy body, the relay fluid storage barrel (700) is further installed with ventilation piping (720), the position of the ventilation piping (720) is higher than that of the fluid source to prevent fluid from overflow, and/or is further installed with a ventilation switch valve (725), if fluid does not enter the inlet, the fluid within the relay fluid storage barrel (700) will be pumped-out by the pump (704), and the ventilation switch valve (725) is controlled by human or by the control device (2000) for eliminating the negative pressure when the pump (704) is pumping-out the fluid within the relay fluid storage barrel (700), such as FIG. 21 is a structural schematic view of an embodiment, showing that the relay fluid storage barrel (700) is further installed with the ventilation piping (720), according to the present invention.

Figure 22:
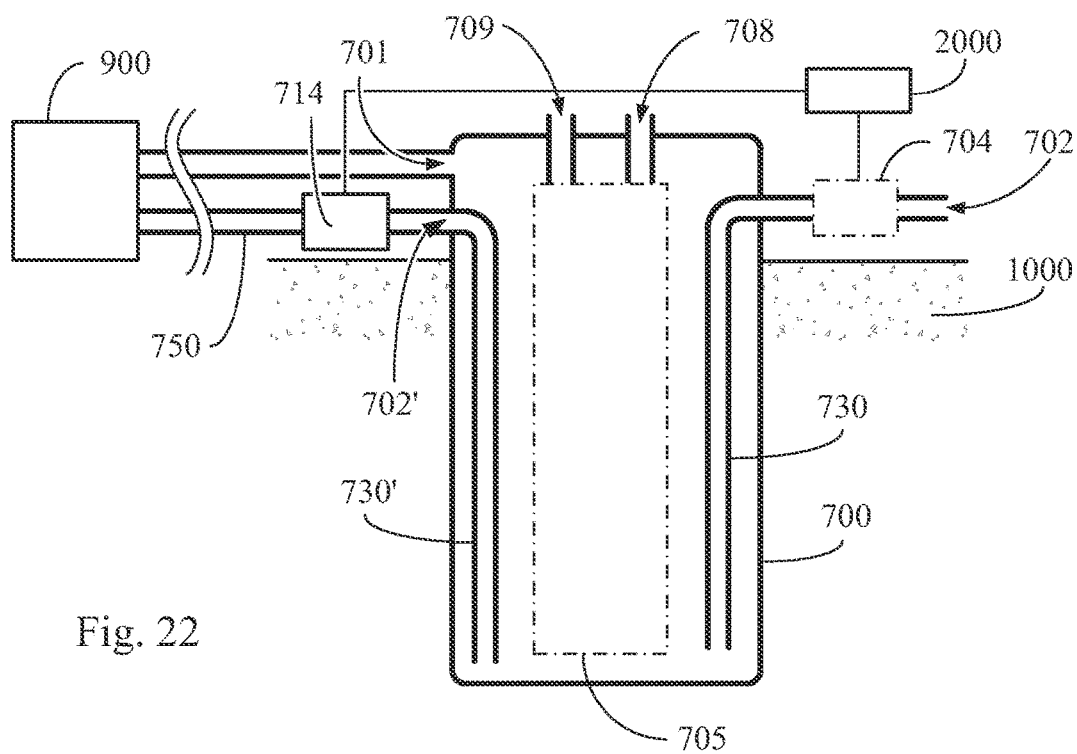
FIG. 22 is a structural schematic view of an embodiment, showing that the relay fluid storage barrel (700) is further installed with a backflow fluid outlet (702'), besides the thermal energy exchanger (705), the fluid outlet (702), and a pump (704), and backflow piping (750) connected with a pump (714) in series is installed between the backflow fluid outlet (702') and upstream fluid piping or fluid source (900), for pumping partial fluid in the relay fluid storage barrel (700) to upstream through the backflow piping (750) to form a semi-closed circuit system with thermal energy adjustment function, according to the present invention.

For the vertical fluid heat exchanger installed within natural thermal energy body, the relay fluid storage barrel (700) is further installed with a backflow fluid outlet (702'), besides the thermal energy exchanger (705), the fluid outlet (702), the pump (704), and the control device (2000), and backflow piping (750) connected with a pump (714) in series is installed between the backflow fluid outlet (702') and upstream fluid piping or fluid source (900), to control the pump (714) by human or by the control device (2000) for pumping partial fluid in the relay fluid storage barrel (700) to upstream through the backflow piping (750) to form a semi-closed circuit system with thermal energy adjustment function; if the position of the backflow fluid outlet (702') is at upper part of the relay fluid storage barrel (700), flow guiding structure (730') for guiding the flow of internal fluid to flow from top to bottom is additional placed inside the relay fluid storage barrel (700), and if the position of the backflow fluid outlet (702') is at lower part of the relay fluid storage barrel (700), the flow guiding structure (730') for guiding the flow of internal fluid to flow from top to bottom is unnecessarily placed inside the relay fluid storage barrel (700), such as FIG. 22 is a structural schematic view of an embodiment, showing that the relay fluid storage barrel (700) is further installed with the backflow fluid outlet (702'), besides the thermal energy exchanger (705), the fluid outlet (702), and the pump (704), and backflow piping (750) connected with a pump (714) in series is installed between the backflow fluid outlet (702') and upstream fluid piping or fluid source (900), for pumping partial fluid in the relay fluid storage barrel (700) to upstream through the backflow piping (750) to form a semi-closed circuit system with thermal energy adjustment function, according to the present invention.

Figure 23:
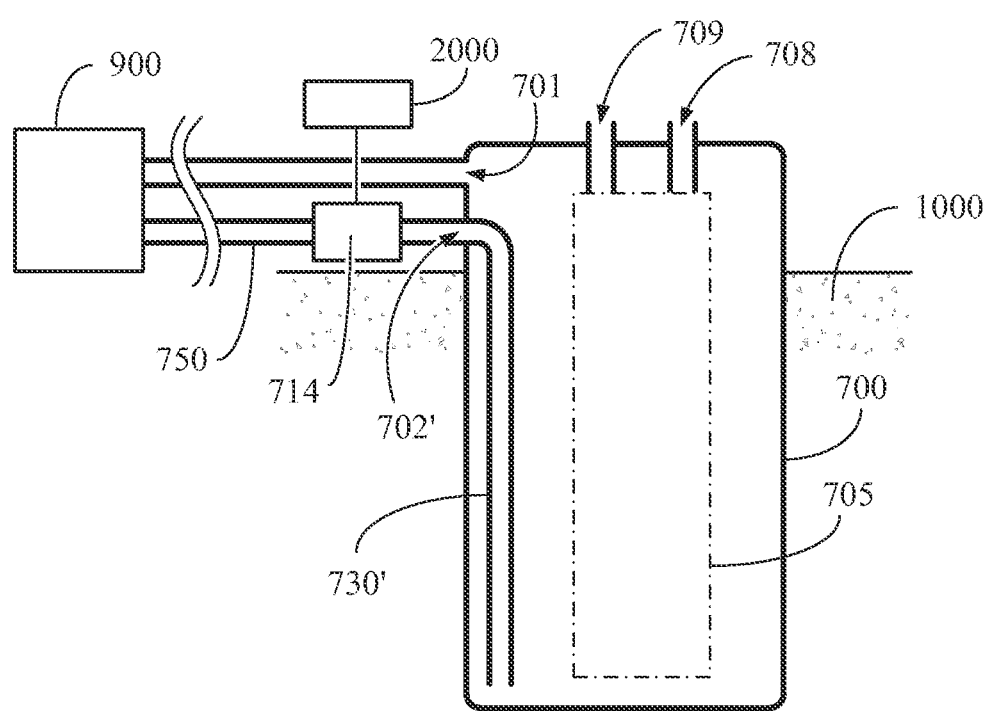
FIG. 23 is a structural schematic view of an embodiment, showing that the relay fluid storage barrel (700) is only kept the thermal energy exchanger (705), and the backflow piping (750) connected with the pump (714) in series is installed between the backflow fluid outlet (702') and upstream fluid piping or the fluid source (900), for pumping the fluid in the relay fluid storage barrel (700) to upstream through the backflow piping (750) to form a closed circuit system with thermal energy adjustment function, according to the present invention.

The relay fluid storage barrel (700) is not installed with the pump (704) and the fluid outlet (702), and is only kept the thermal energy exchanger (705), and the backflow piping (750) connected with the pump (714) in series is installed between the backflow fluid outlet (702') and upstream fluid piping or the fluid source (900), to control the pump (714) by human or by the control device (2000) for pumping the fluid in the relay fluid storage barrel (700) to upstream through the backflow piping (750) to form a closed circuit system with thermal energy adjustment function; if the position of the backflow fluid outlet (702') is at upper part of the relay fluid storage barrel (700), the flow guiding structure (730') for guiding the flow of internal fluid to flow from top to bottom is additional placed inside the relay fluid storage barrel (700), and if the position of the backflow fluid outlet (702') is at lower part of the relay fluid storage barrel (700), the flow guiding structure (730') for guiding the flow of internal fluid to flow from top to bottom is unnecessarily placed inside the relay fluid storage barrel (700), such as FIG. 23 is a structural schematic view of an embodiment, showing that the relay fluid storage barrel (700) is only kept the thermal energy exchanger (705), and the backflow piping (750) connected with the pump (714) in series is installed between the backflow fluid outlet (702') and upstream fluid piping or the fluid source (900), for pumping the fluid in the relay fluid storage barrel (700) to upstream through the backflow piping (750) to form a closed circuit system with thermal energy adjustment function, according to the present invention.

Figure 24:
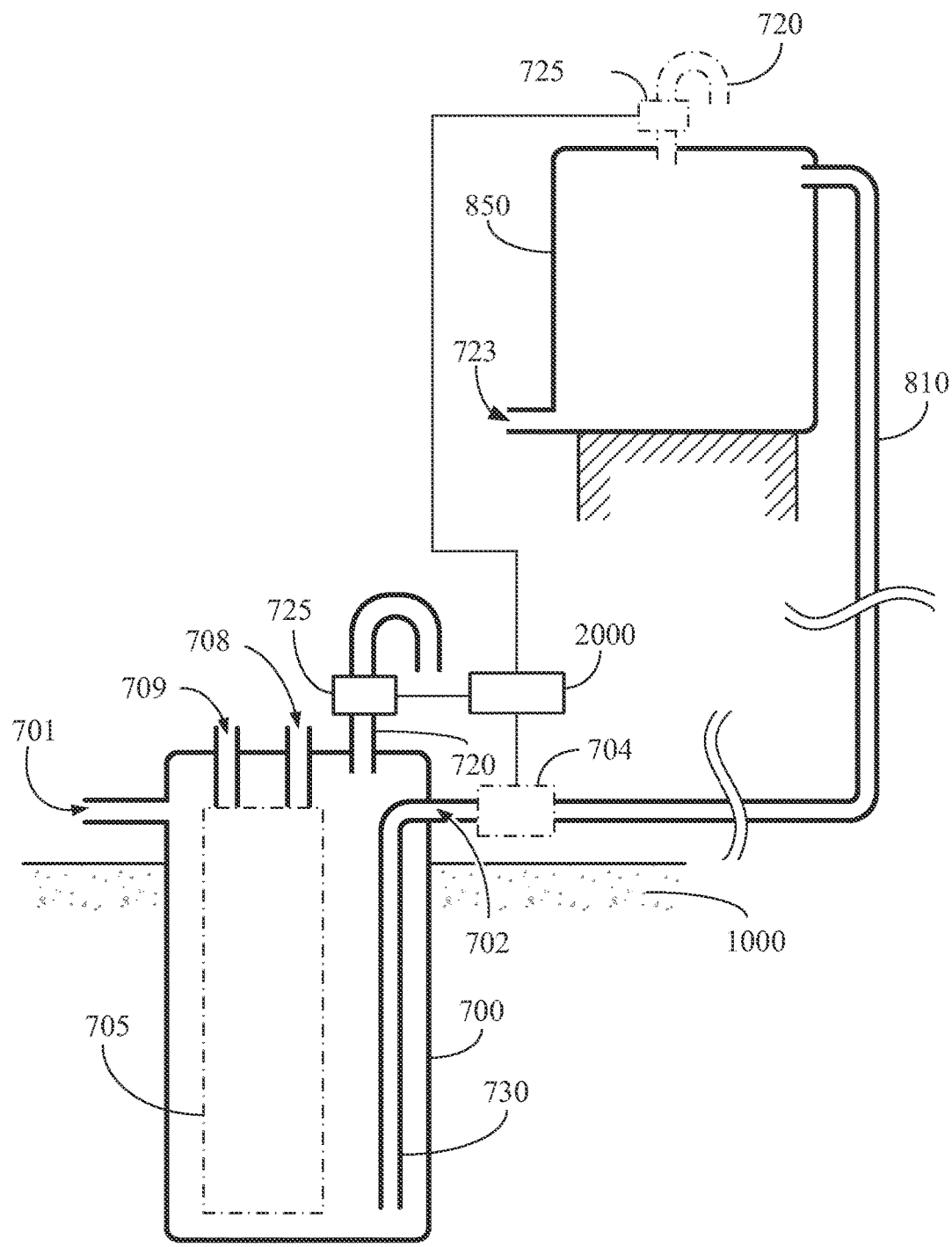
FIG. 24 is a structural schematic view of an embodiment, showing that secondary segment fluid storage facilities (850) is installed at the position higher than that of the relay fluid storage barrel (700), for storing the fluid pumped by the pump (704) through fluid piping (810), according to the present invention.

For the vertical fluid heat exchanger installed within natural thermal energy body, secondary segment fluid storage facilities (850) is further installed at the position higher than that of the relay fluid storage barrel (700), for storing the fluid pumped by the pump (704) through fluid piping (810), in which the secondary segment fluid storage facilities (850) is the semi-closed or full-closed type fluid terminal storage facilities (850), and/or which is installed with a fluid port (723) for fluid external flow, and/or the ventilation piping (720) and/or the ventilation switch valve (725) are installed at the top of the fluid terminal storage facilities (850), such as FIG. 24 is a structural schematic view of an embodiment, showing that the secondary segment fluid storage facilities (850) is installed at the position higher than that of the relay fluid storage barrel (700), for storing the fluid pumped by the pump (704) through fluid piping (810), according to the present invention.

Figure 25:
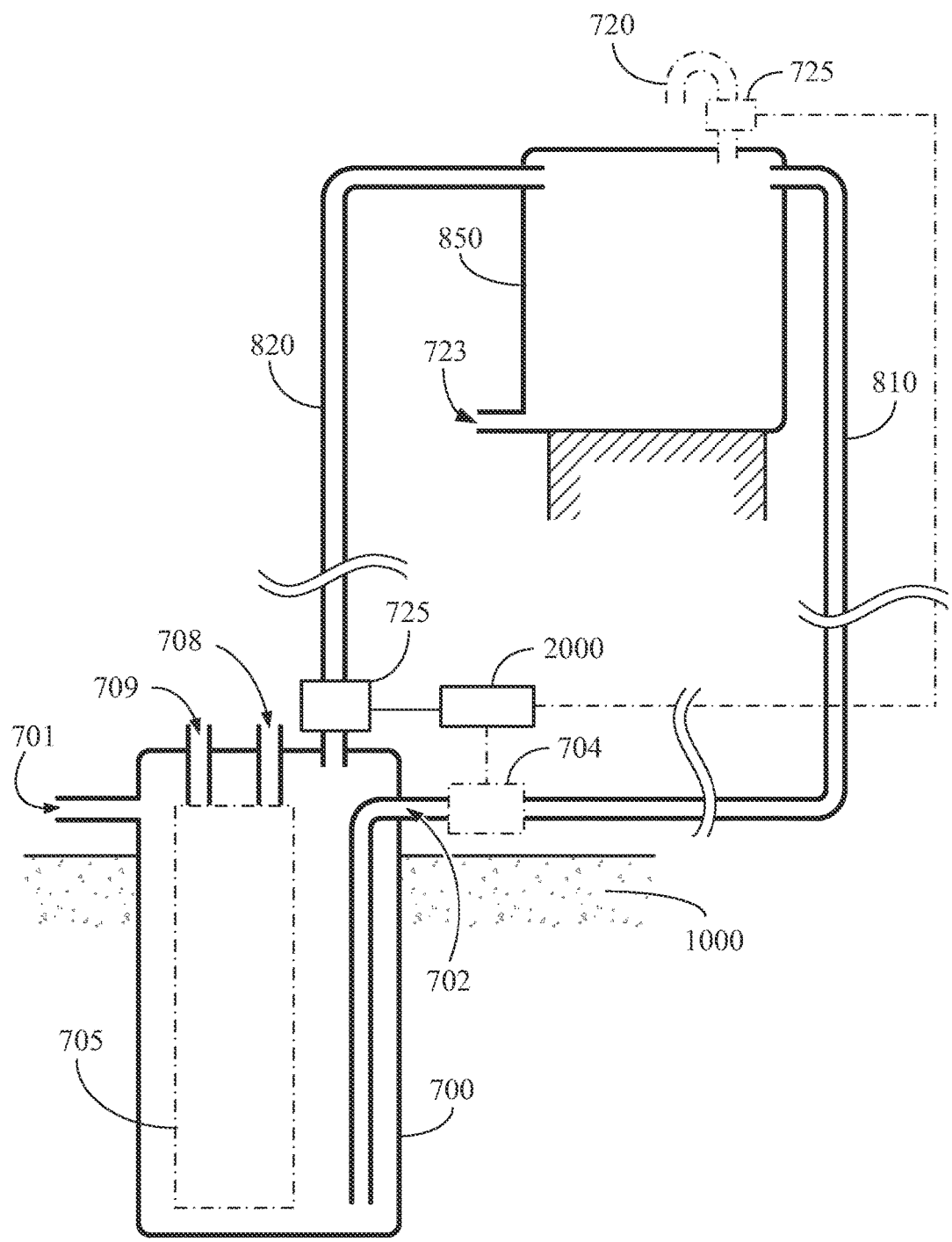
FIG. 25 is a structural schematic view of an embodiment, showing that the secondary segment fluid storage facilities (850) is installed at the position higher than that of the relay fluid storage barrel (700), for storing the fluid pumped by the pump (704) through the fluid piping (810), the secondary segment fluid storage facilities (850) is the fluid terminal storage facilities, or which is installed with a fluid port (723) for fluid external flow, and auxiliary fluid piping (820) is installed between the relay fluid storage barrel (700) and the secondary segment fluid storage facilities (850), according to the present invention.

For the vertical fluid heat exchanger installed within natural thermal energy body, the secondary segment fluid storage facilities (850) is further installed at the position higher than that of the relay fluid storage barrel (700), for storing the fluid pumped by the pump (704), which is controlled by human or by the control device (2000), and pumped into the secondary segment fluid storage facilities (850) through the fluid piping (810), in which the secondary segment fluid storage facilities (850) is the semi-closed or full-closed type fluid terminal storage facilities, and/or which is installed with the fluid port (723) for fluid external flow; the secondary segment fluid storage facilities (850) is enclosed or non-closed structure, and/or which is installed with the ventilation piping (720) or the ventilation switch valve (725), and auxiliary fluid piping (820) is installed between the relay fluid storage barrel (700) and the secondary segment fluid storage facilities (850), in place of the ventilation piping (720) of the relay fluid storage barrel (700), and/or the ventilation piping (720) and/or the ventilation switch valve (725) are installed at the top of the fluid terminal storage facilities (850) (such as FIG. 25 is a structural schematic view of an embodiment, showing that the secondary segment fluid storage facilities (850) is further installed at the position higher than that of the relay fluid storage barrel (700), for storing the fluid pumped by the pump (704) through the fluid piping (810), the secondary segment fluid storage facilities (850) is the fluid terminal storage facilities, or which is installed with a fluid port (723) for fluid external flow, and the auxiliary fluid piping (820) is installed between the relay fluid storage barrel (700) and the secondary segment fluid storage facilities (850), according to the present invention).

If the secondary segment fluid storage facilities (850) is enclosed structure, the fluid within the relay fluid storage barrel (700) is pumped by the pump (704), which is controlled by human or by the control device (2000), and enters into the secondary segment fluid storage facilities (850) through the fluid piping (810), and the air within the secondary segment fluid storage facilities (850) enters into the space of the relay fluid storage barrel (700) via the auxiliary fluid piping (820), which is produced by pumping fluid.

Figure 26:
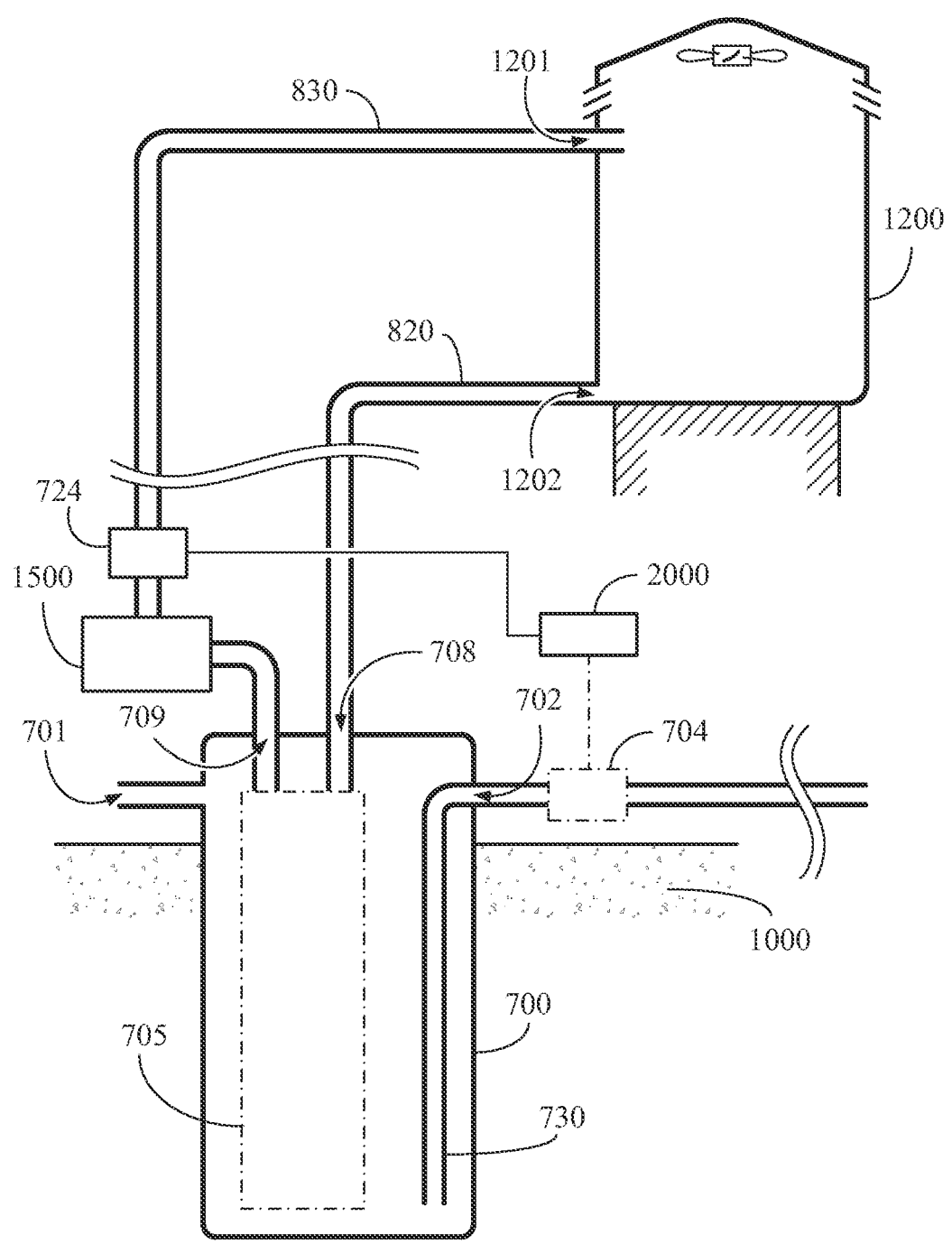
FIG. 26 is a system schematic view of the first embodiment, showing the operation of air conditioning cooling towers connected in series, according to the present invention.

For the vertical fluid heat exchanger installed within natural thermal energy body, which is further applied for the operation of air conditioning cooling towers connected in series, the water cooled by cooling towers is pumped back to air conditioning device through the connected in series flow paths of the thermal energy exchanger (705) installed within the relay fluid storage barrel (700), such as FIG. 26 is a system schematic view of the first embodiment, showing the operation of air conditioning cooling towers connected in series, according to the present invention; as shown in FIG. 26, the main components include:

Relay fluid storage barrel (700): made of thermal conductive material to be integrated or combined, wherein the relay fluid storage barrel (700) is a fluid heat exchanger with the form of vertical relay fluid storage barrel for being close installed, or whole or in part placement into natural thermal energy body (1000) in vertical or downward oblique manner, and the relay fluid storage barrel (700) is installed with at least one fluid inlet (701) and at least one fluid outlet (702) for fluid entering and leaving to perform fluid exchange function; in which the fluid inlet (701) is installed at the position lower than that of the relay fluid storage barrel (700), and the fluid outlet (702) is installed at the position higher than that of the relay fluid storage barrel (700), or vice versa, to prevent the fluid at lower part within the relay fluid storage barrel (700) from stagnation; or as shown in FIG. 26, the fluid inlet (701) and the fluid outlet (702) are installed at upper part within the relay fluid storage barrel (700) to facilitate maintenance, and the flow guiding structure (730) for guiding the flow of internal fluid to flow from top to bottom is placed inside the relay fluid storage barrel (700) to connect the fluid inlet (701) and/or the fluid outlet (702), for ensuring the flow path between the fluid inlet (701) and the fluid outlet (702) passing through the bottom of the relay fluid storage barrel (700) to prevent the fluid at lower part within the relay fluid storage barrel (700) from stagnation; and wherein the fluid passing through the relay fluid storage barrel (700) is controlled by human or by control device (2000) for pumping or pump-priming, by way of external pressure, or gravity with potential difference, or the pump (704) being installed at the fluid inlet (701) and/or the fluid outlet (702), to drive the fluid in liquid state, or gaseous state, or liquid to gaseous state, or gaseous to liquid state for pumping, or stop, or adjustment of pumping flow rate;

there are one or more cylindrical relay fluid storage barrels (700) inside installed with the thermal energy exchanger (705), and if two or more relay fluid storage barrels (700) exist, the fluid pathways in the individual relay fluid storage barrel (700) are series connection, parallel connection, or series-parallel connection;

the thermal energy exchanger (705) has independent flow paths for fluid passing through, to perform heat exchange with the fluid in the relay fluid storage barrel (700); and the fluid piping of the thermal energy exchangers (705) are installed with the fluid inlet (708) and the fluid outlet (709);

the individual fluid pathway of the thermal energy exchanger (705) is installed with fluid inlet and fluid outlet; and the fluid passing through the fluid pathway of the thermal energy exchanger (705) is controlled for pumping or pump-priming, by way of external pressure, or gravity with potential difference, or the pump (714) being installed, to individually drive the same or different fluid in liquid state, or gaseous state, or liquid to gaseous state, or gaseous to liquid state; and Cooling tower (1200): related to a conventional air conditioning cooling tower, wherein the cooling tower installed with a high temperature water inlet (1201) and a cooling water outlet (1202) is a heat exchanger for passing through the auxiliary fluid piping (820) and leading to the fluid inlet (708) of the thermal energy exchanger (705), and then leaving the fluid outlet (709) and leading to air-conditioning device (1500), and high temperature water pumped by the pump (724) connected in series for passing through auxiliary fluid piping (830) to the high temperature water inlet (1201) and entering into the cooling tower (1200).

Figure 27:
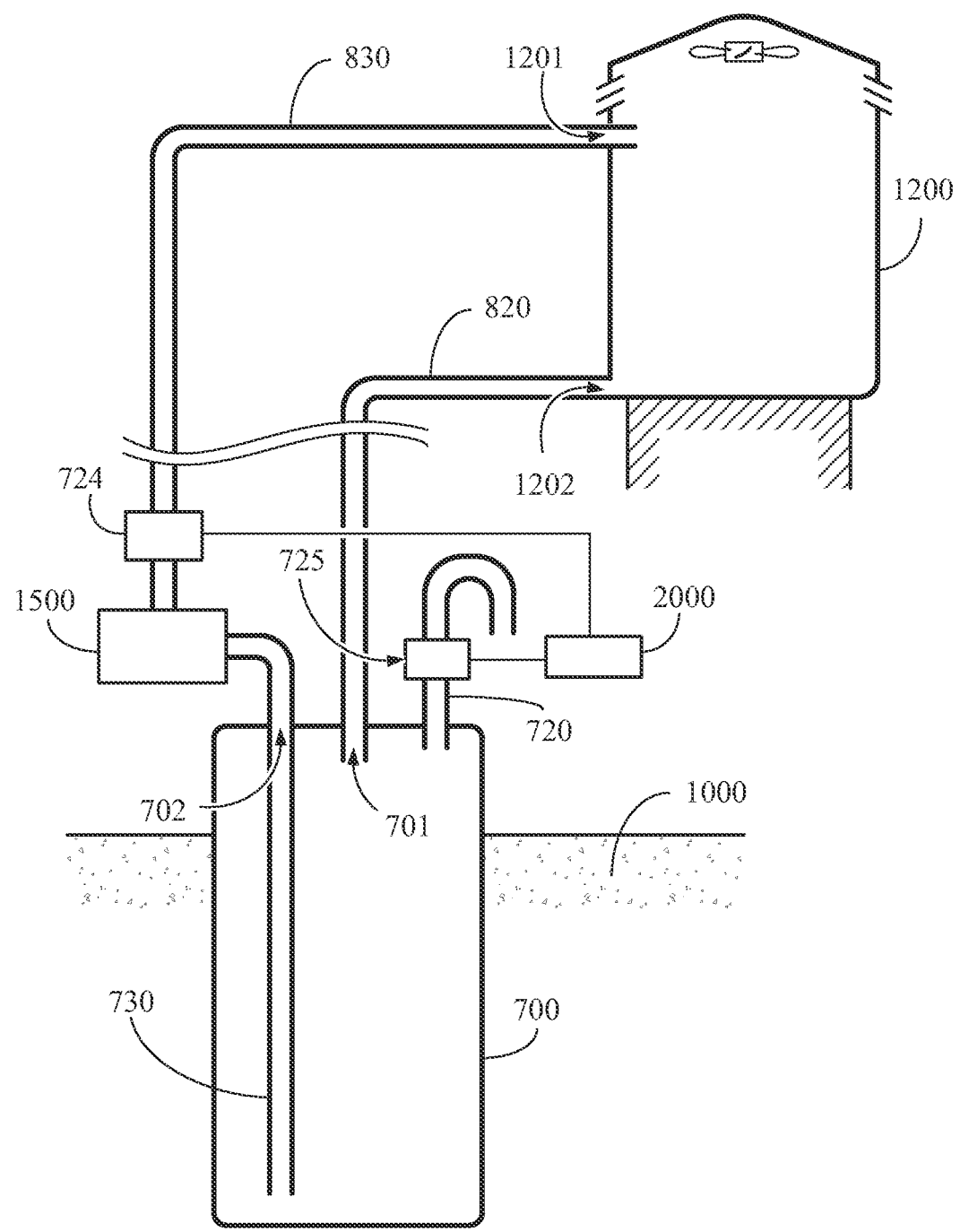
FIG. 27 is a system schematic view of the second embodiment, showing the operation of air conditioning cooling towers connected in series, according to the present invention.

FIG. 27 is a system schematic view of the second embodiment, showing the operation of air conditioning cooling towers connected in series, according to the present invention, which shows the states of the relay fluid storage barrel (700), as shown in the embodiment of FIG. 26, directly storing fluids and the fluid inlet (701) and the fluid outlet (702), wherein the fluid within the heat exchanger of air-conditioning device (1500) is pumped by a pump (724) and/or the ventilation switch valve (725), which are controlled by the control device (2000), for passing through the auxiliary fluid piping (830), and entering into the cooling tower (1200) from the high temperature water inlet (1201), and then the fluid leaves the cooling water outlet (1202), passes through the fluid inlet (701) via the auxiliary fluid piping (820), enters into the relay fluid storage barrel (700), and is transmitted to the fluid inlet of the air-conditioning device (1500) via the fluid outlet (702); the relay fluid storage barrel (700) without the thermal energy exchanger (705) performs heat exchange with the natural thermal storage body through the shell thereof.

Figure 28:
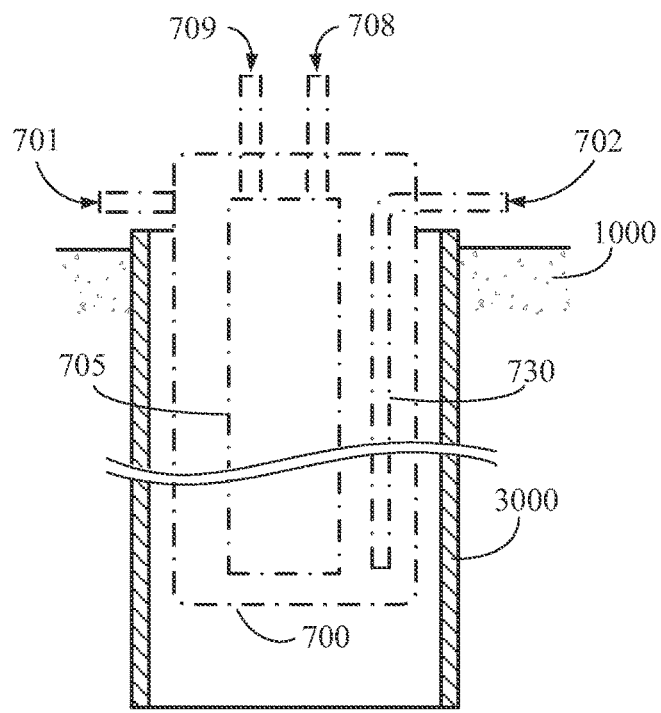
FIG. 28 is a structural schematic view of an embodiment, showing that an external conduit (3000) is installed around the relay fluid storage barrel (700), according to the present invention.

For the vertical fluid heat exchanger installed within natural thermal energy body, if whole or in part of which is placed into natural thermal energy body installed in water or strata, an external conduit (3000), whose internal diameter is bigger than or equal to the external diameter of the relay fluid storage barrel (700), is further installed around the relay fluid storage barrel (700), such as FIG. 28 is a structural schematic view of an embodiment, showing that the external conduit (3000) is installed around the relay fluid storage barrel (700), according to the present invention; wherein:

External conduit (3000): made of conductive materials, wherein the internal diameter of which is bigger than or equal to the external diameter of the relay fluid storage barrel (700), and the length of which is equal to or longer than that of the relay fluid storage barrel (700); and wherein the external conduit (3000) directly contacts with the relay fluid storage barrel (700), and there is an interval for placement or removement of the relay fluid storage barrel (700), or for filling conductive materials in colloidal state, and/or liquid state, and/or solid state.

In the vertical fluid heat exchanger installed within natural thermal energy body, the relay fluid storage barrel (700) can be further formed to a longer two-step and more than two-step structure, in which the top portion is larger and the bottom portion is smaller, and is a cylindrical or step-like column member having at least three faces, for increasing the heat conduction area with the natural thermal energy body.

Figure 29:
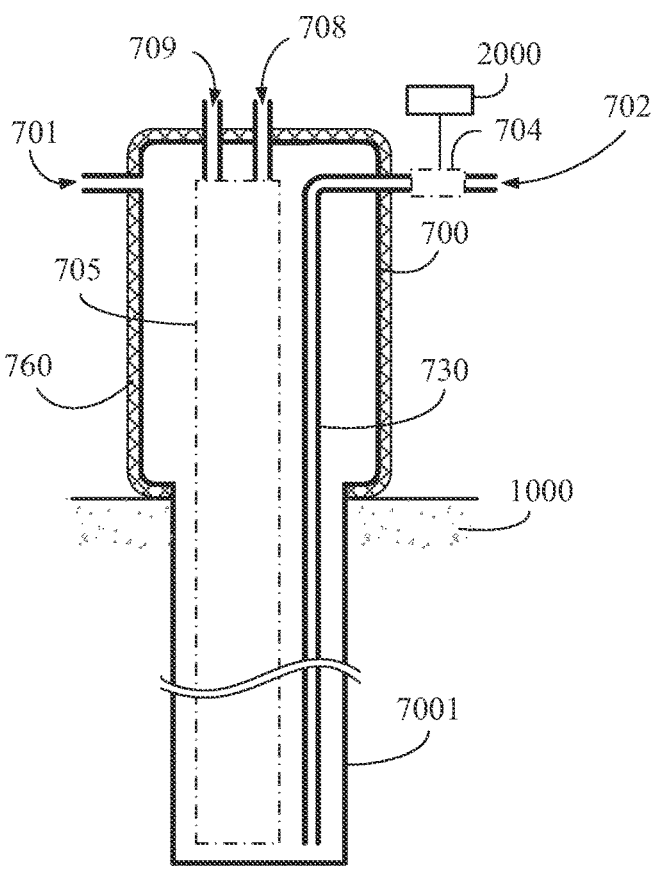
FIG. 29 is a structural schematic view of an embodiment, showing the relay fluid storage barrel (700) is formed to a longer two-step structure having a larger top portion and a smaller bottom portion, and the top portion thereof is placed on the surface of the natural thermal energy body, the bottom portion is placed into the natural thermal energy body.

FIG. 29 is a structural schematic view of an embodiment, showing the relay fluid storage barrel (700) is formed to a longer two-step structure having a larger top portion and a smaller bottom portion, and the top portion thereof is placed on the surface of the natural thermal energy body, the bottom portion is placed into the natural thermal energy body;

As shown in FIG. 29, wherein the main components and installation manner of the relay fluid storage barrel (700) are as followings:

relay fluid storage barrel (700) made of a heat conductive material and formed to a two-step or more than two-step structure in which the top end being larger than the bottom end, including a top portion structure having a larger cross section area and a bottom portion structure having a smaller cross section area, the cross section shape of the bottom portion of relay fluid storage barrel (7001) perpendicular to the axle direction includes round, oval or polyhedron shapes having three or more than three faces;

heat insulation member (760): includes a heat insulation member formed through fabricating the part of the relay fluid storage barrel (700) exposed outside the housing of the natural thermal energy body with a heat insulation material, or a heat insulation member made of a heat insulation material for covering the part of the relay fluid storage barrel (700) exposed outside the housing of the natural thermal energy body;

installation manner is that the top portion is placed on the surface of the natural thermal energy body, the bottom portion is placed into the natural thermal energy body.

Figure 30:
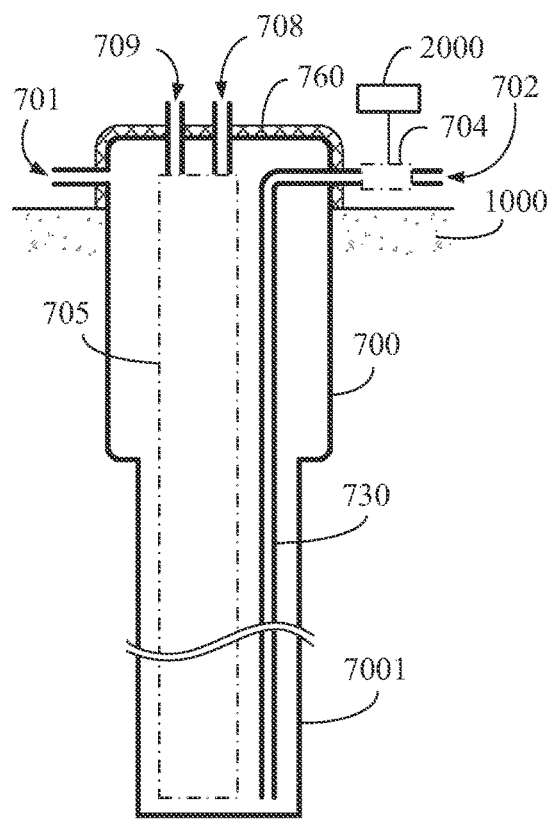
FIG. 30 is a structural schematic view of an embodiment, showing the relay fluid storage barrel (700) is formed to a longer two-step structure having a larger top portion and a smaller bottom portion, a part of the larger top portion and the whole smaller bottom portion connected therewith are placed into the natural thermal energy body.

FIG. 30 is a structural schematic view of an embodiment, showing the relay fluid storage barrel (700) is formed to a longer two-step structure having a larger top portion and a smaller bottom portion, a part of the larger top portion and the whole smaller bottom portion connected therewith are placed into the natural thermal energy body;

As shown in FIG. 30, wherein the main components and installation manner of the relay fluid storage barrel (700) are as followings:

relay fluid storage barrel (700) made of a heat conductive material and formed to a two-step or more than two-step structure in which the top end being larger than the bottom end, including a top portion structure having a larger cross section area and a bottom portion having a smaller cross section area, the cross section shape of the bottom portion of relay fluid storage barrel (7001) perpendicular to the axle direction includes round, oval or polyhedron shapes having three or more than three faces;

heat insulation member (760): includes a heat insulation member formed through fabricating the part of the relay fluid storage barrel (700) exposed outside the housing of the natural thermal energy body with a heat insulation material, or a heat insulation member made of a heat insulation material for covering the part of the relay fluid storage barrel (700) exposed outside the housing of the natural thermal energy body;

installation manner is that the topmost section of the larger top portion is placed on the natural thermal energy body, a part of the larger top portion and the whole smaller bottom portion connected therewith are placed into the natural thermal energy body.

Figure 31:
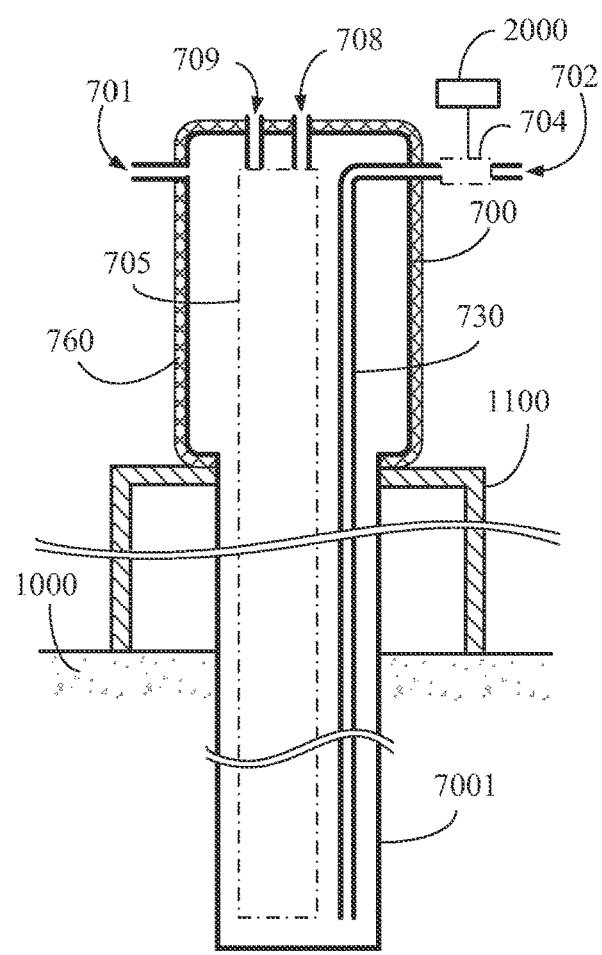
FIG. 31 is a structural schematic view of an embodiment, showing the relay fluid storage barrel (700) is formed to a longer two-step structure having a larger top portion and a smaller bottom portion, the larger top portion of the relay fluid storage barrel (700) is supported by a gantry structure (1100), and the smaller bottom portion downwardly extends into the natural thermal energy body.

FIG. 31 is a structural schematic view of an embodiment, showing the relay fluid storage barrel (700) is formed to a longer two-step structure having a larger top portion and a smaller bottom portion, the larger top portion of the relay fluid storage barrel (700) is supported by a gantry structure (1100), and the smaller bottom portion downwardly extends into the natural thermal energy body;

As shown in FIG. 31, wherein the main components and installation manner of the relay fluid storage barrel (700) are as followings:

relay fluid storage barrel (700) made of a heat conductive material and formed to a two-step or more than two-step structure in which the top end being larger than the bottom end, including a top portion structure having a larger cross section area and a bottom portion having a smaller cross section area, the cross section shape of the relay fluid storage barrel (700) perpendicular to the axle direction includes round, oval or polyhedron shapes having three or more than three faces;

heat insulation member (760): includes a heat insulation member formed through fabricating the part of the relay fluid storage barrel (700) exposed outside the housing of the natural thermal energy body with a heat insulation material, or a heat insulation member made of a heat insulation material for covering the part of the relay fluid storage barrel (700) exposed outside the housing of the natural thermal energy body;

installation manner is that the larger top portion of the relay fluid storage barrel (700) is supported by a gantry structure (1100), and the smaller bottom portion is downwardly placed into the natural thermal energy body.

In the vertical fluid heat exchanger placed within natural thermal energy body, the relay fluid storage barrel (700) is formed to a structure with a cone shape in which the top portion being larger than the bottom portion, or a structure with a taper or trapezoid shape having at least three faces.

FIG. 32 is a structural schematic view of an embodiment, showing the relay fluid storage barrel (700) is formed to a cone shape;

As shown in FIG. 32, wherein the main components and installation manner of the relay fluid storage barrel (700) are as followings:

relay fluid storage barrel (700) made of a heat conductive material and formed to a cone shape structure in which the top end being larger then the bottom end, including a top portion structure having a larger cross section area and a bottom portion having a smaller cross section area, the cross section shape of the relay fluid storage barrel (700) perpendicular to the axle direction includes round or oval shapes;

heat insulation member (760): includes a heat insulation member formed through fabricating the part of the relay fluid storage barrel (700) exposed outside the housing of the natural thermal energy body with a heat insulation material, or a heat insulation member made of a heat insulation material for covering the part of the relay fluid storage barrel (700) exposed outside the housing of the natural thermal energy body;

installation manner is that a part of the top portion structure, having larger cross section area, of the cone shape structure is placed on the surface of the natural thermal energy body, and the bottom portion, having smaller cross section area, is placed into the natural thermal energy body.

FIG. 33 is a structural schematic view of an embodiment, showing the relay fluid storage barrel (700) is formed to a reverse taper shape three-dimension polyhedron;

As shown in FIG. 33, wherein the main components and installation manner of the relay fluid storage barrel (700) are as followings:

relay fluid storage barrel (700) made of a heat conductive material and formed to a taper shape three-dimension polyhedron structure, including a top portion structure having a larger cross section area and a bottom portion having a smaller cross section area, the cross section shape of the relay fluid storage barrel (700) perpendicular to the axle direction includes polyhedron shapes having three or more than three faces;

heat insulation member (760): includes a heat insulation member formed through fabricating the part of the relay fluid storage barrel (700) exposed outside the housing of the natural thermal energy body with a heat insulation material, or a heat insulation member made of a heat insulation material for covering the part of the relay fluid storage barrel (700) exposed outside the housing of the natural thermal energy body;

installation manner is that the top portion structure, having larger cross section area, of the taper shape three-dimension polyhedron structure is placed on the surface of the natural thermal energy body, the bottom portion having smaller cross section is placed into the natural thermal energy body.

Figure 34:
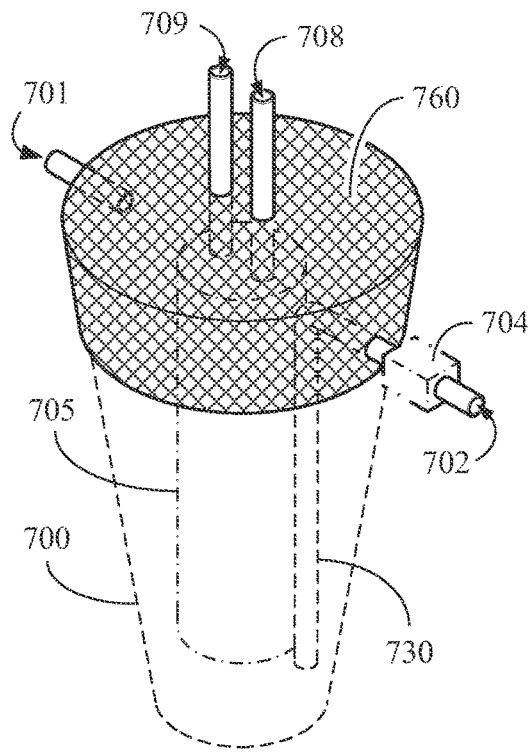
FIG. 34 is a structural schematic view of an embodiment, showing the relay fluid storage barrel (700) is formed to a reverse trapezoid cone shape structure.

FIG. 34 is a structural schematic view of an embodiment, showing the relay fluid storage barrel (700) is formed to a reverse trapezoid cone shape structure;

As shown in FIG. 34, wherein the main components and installation manner of the relay fluid storage barrel (700) are as followings:

relay fluid storage barrel (700) made of a heat conductive material and formed to a trapezoid cone shape structure in which the top end being larger than the bottom end, including a top portion structure having a larger cross section area and a bottom portion having a smaller cross section area, the cross section shape of the relay fluid storage barrel (700) perpendicular to the axle direction includes round or oval shapes;

heat insulation member (760): includes a heat insulation member formed through fabricating the part of the relay fluid storage barrel (700) exposed outside the housing of the natural thermal energy body with a heat insulation material, or a heat insulation member made of a heat insulation material for covering the part of the relay fluid storage barrel (700) exposed outside the housing of the natural thermal energy body;

installation manner is that a part of the top portion structure, having larger cross section area, of the trapezoid cone shape structure is placed on the surface of the natural thermal energy body, the bottom portion having smaller cross section area is placed into the natural thermal energy body.

Figure 35:
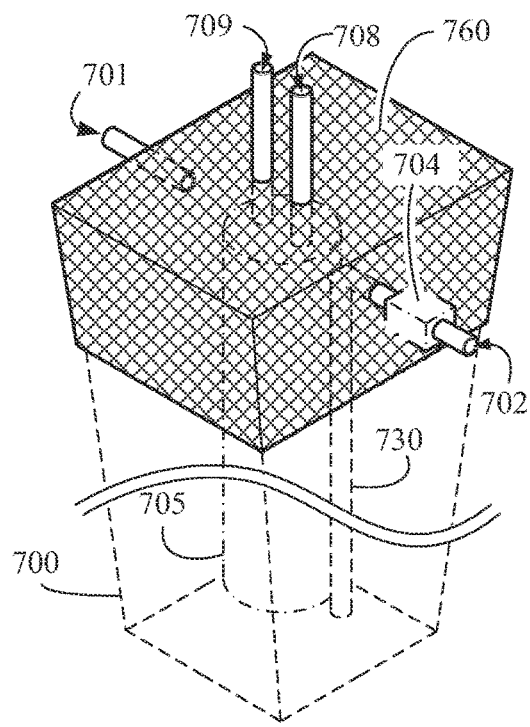
FIG. 35 is a structural schematic view of an embodiment, showing the relay fluid storage barrel (700) is formed to a reverse trapezoid taper shape three-dimension polyhedron.

FIG. 35 is a structural schematic view of an embodiment, showing the relay fluid storage barrel (700) is formed to a reverse trapezoid taper shape three-dimension polyhedron;

As shown in FIG. 35, wherein the main components and installation manner of the relay fluid storage barrel (700) are as followings:

relay fluid storage barrel 700 made of a heat conductive material and formed to a trapezoid taper shape three-dimension polyhedron structure in which the top end being larger than the bottom end, including a top portion structure having a larger cross section area and a bottom portion having a smaller cross section area, the cross section shape of the relay fluid storage barrel (700) perpendicular to the axle direction includes polyhedron shapes having three or more than three faces;

heat insulation member (760): includes a heat insulation member formed through fabricating the part of the relay fluid storage barrel (700) exposed outside the housing of the natural thermal energy body with a heat insulation material, or a heat insulation member made of a heat insulation material for covering the part of the relay fluid storage barrel (700) exposed outside the housing of the natural thermal energy body;

installation manner is that a part of the top portion structure, having larger cross section structure, of the trapezoid taper shape three-dimension polyhedron structure is placed on the surface of the natural thermal energy body, the bottom portion having smaller cross section area is placed into the natural thermal energy body.

The invention claimed is:

1. A vertical heat exchanger installed within a natural thermal energy body (1000) and installed in a water supply system for supplying water from an external tap water source or a river, lake, or sea, comprising:

a relay storage barrel (700) made of a thermally conductive material and partly placed in or installed in contact with the natural thermal energy body (1000) in a vertical or downwardly oblique orientation for temporarily storing the water from the external tap water source or river, lake, or sea as it passes through the relay storage barrel (700), wherein a top section of the relay storage barrel (700) extends out of the natural thermal body, said water directly exchanging thermal energy with the natural thermal energy body (1000) through the thermally conductive material as the water passes through the relay storage barrel (700) from a first fluid inlet (701) connected to the external tap water source or the river, lake, or sea;

at least one thermal energy exchanger (705) installed inside the relay storage barrel (700) and having piping that forms at least one independent thermal exchange fluid flow path for passage of a thermal exchange fluid, said piping having a second fluid inlet (708) and a second fluid outlet (709), wherein the thermal energy exchanger (705) exchanges thermal energy between the water from the external tap water source or river, lake, or sea and the thermal exchange fluid in the thermal energy exchanger (705), and wherein the thermal energy exchanger (705) extends vertically into the relay storage barrel (700) and has a first side and a second side, the first side being spaced horizontally from the second side, wherein said relay storage barrel (700) includes said first fluid inlet (701) on the first side of the at least one thermal energy exchanger (705) and a first fluid outlet (702) on the second side of the at least one thermal energy exchanger (705) through which the water from the external tap water source or river, lake, or sea exits the relay storage barrel (700), and the first fluid inlet (701) is connected to receive the said water from the external tap water source or river, lake, or sea without recirculation from the first fluid outlet (702) to the first fluid inlet (701), wherein said water flows from the external source of tap water source or the river, lake, or sea through the first fluid inlet (701) on the first side of the at least one thermal energy exchanger (705), through the at least one thermal energy exchanger (705), and from the at least one thermal energy exchanger (705) to the first fluid outlet (702) on the second side of the at least one thermal energy exchanger (705), and wherein a flow rate of said water as it passes from the external source of tap water or the river, lake, or sea and through the first fluid inlet (701), the at least one thermal energy exchanger (705), and the first fluid outlet (702), is controlled manually or by a control device (2000).

2. A vertical heat exchanger installed within a natural thermal energy body (1000) as claimed in claim 1, wherein one of said first fluid inlet (701) and said first fluid outlet (702) being installed a position lower than the other of said first fluid inlet (701) and first fluid outlet (702) to prevent stagnation of the water from the external tap water source or river, lake, or sea in a lower part of the relay storage barrel (700).

3. A vertical heat exchanger installed within a natural thermal energy body (1000) as claimed in claim 1, wherein one of said first fluid inlet (701) and said first fluid outlet (702) being installed a position lower than the other of said first fluid inlet (701) and first fluid outlet (702) to prevent stagnation of the water from the external tap water source or river, lake, or sea in a lower part of the relay storage barrel (700), the piping of the thermal energy exchanger (705) includes at least one of the following geometric shaped piping configurations: U-shaped fluid piping, spiral fluid piping, wavy fluid piping, and U-shaped piping additionally installed with thermally conductive fins.

4. A vertical heat exchanger installed within a natural thermal energy body (1000) as claimed in claim 3, wherein said thermal energy exchanger (7050) includes at least one second said piping having a third fluid inlet (708') and a third fluid outlet (709'), said at least one second piping carrying a same or different thermal exchange fluid than the first piping of the thermal energy exchanger (705) of the thermal energy exchanger (7050), and wherein said first and at least one second fluid piping are connected in parallel, series, or series-parallel.

5. A vertical heat exchanger installed within a natural thermal energy body (1000) as claimed in claim 4, wherein the first piping and the second piping are U-shaped piping, said first and second piping have one of the following configurations: parallel and side-by-side; parallel and stacked; and parallel and crossing at a 90 degree angle.

6. A vertical heat exchanger installed within a natural thermal energy body (1000) as claimed in claim 1, further comprising at least a second thermal energy exchanger (705') that includes at least one second said piping having a fluid inlet (708') and a second fluid outlet (709'), said at least one second piping carrying a same or different thermal exchange fluid than the first piping of the thermal energy exchanger (705), and wherein said first and second fluid piping are connected in parallel, series, or series-parallel.

7. A vertical heat exchanger installed within a natural thermal energy body (1000) as claimed in claim 6, wherein the first piping and the second piping are U-shaped piping, said first and second piping have one of the following configurations: parallel and side-by-side; parallel and stacked; and parallel and crossing at a 90 degree angle.

8. A vertical heat exchanger installed within a natural thermal energy body (1000) as claimed in claim 1, wherein the natural thermal body (1000) is a layer of earth or a body of water.

9. A vertical heat exchanger installed within a natural thermal energy body (1000) as claimed in claim 1, wherein said thermal exchange fluid is in one of, a gaseous state, a liquid-to-gaseous state, and a gaseous-to-liquid state.

10. A vertical heat exchanger installed within a natural thermal energy body (1000) as claimed in claim 1, further comprising a pump (704) installed at the first fluid inlet (701), the first fluid outlet (702), or both the first fluid inlet (701) and the first fluid outlet (702), said pump (704) being manually controlled or controlled by the control device (2000).

11. A vertical heat exchanger installed within a natural thermal energy body (1000) as claimed in claim 1, further comprising at least one switch valve (703) for opening and closing at least one of said first fluid inlet (701) and first fluid outlet (702) to stop, start, or control a flow rate of said water from the external tap water source or river, lake, or sea into and out of said relay storage barrel (700), said switch valve (703) being manually controlled or controlled by a control device (2000).

12. A vertical heat exchanger installed within a natural thermal energy body (1000) as claimed in claim 1, wherein the piping of the thermal energy exchanger (705) includes at least one of the following geometric shaped piping configurations: U-shaped fluid piping, spiral fluid piping, wavy fluid piping, and U-shaped piping additionally installed with thermally conductive fins.

13. A vertical heat exchanger installed within a natural thermal energy body (1000) as claimed in claim 12, wherein at least one of said first fluid inlet (701) and first fluid outlet (702) is connected to a respective first inlet or first fluid outlet of a second relay storage barrel (700).

14. A vertical heat exchanger installed within a natural thermal energy body (1000) as claimed in claim 1, wherein said relay storage barrel (700) one of a circular, oval, or star-shaped cross-section.

15. A vertical heat exchanger installed within a natural thermal energy body (1000) as claimed in claim 1, further comprising a first controllable valve (801) installed at said first fluid inlet, a second controllable valve (802) installed at the fluid outlet (702), and shunt piping (800) connecting said first controllable valve (801) with said second controllable valve (802), said first controllable valve (801) and second controllable valve (802) regulating flow of the water from the external tap water source or river, lake, or sea into and out of the relay storage barrel (700) by controlling shunting of the water through the shunt piping (800) according to one or more of the following flow control modes:
 (a) blocking the water from passing through the shunt piping (800) so that all of the water flows into and out of the relay storage barrel (700);
 (b) blocking the water from entering into the relay storage barrel (700) so that all of the water flows through the shunt piping (800);
 (c) enabling part of the water to flow into the relay storage barrel (700) and part of the water to flow through the shunt piping (800); and
 (d) adjusting a flow rate of the water into the relay storage barrel (700).

16. A vertical heat exchanger installed within a natural thermal energy body (1000) as claimed in claim 1, wherein overflow of the water from the external tap water source or river, lake, or sea is prevented by one or both of (a) ventilation piping (720) installed at a position higher than a position of a source of the-water to prevent overflow of the-water, and (b) a ventilation switch valve (725) that is manually controlled or controlled by a control device (2000) to eliminate a negative pressure caused by pumping the water out of the relay storage barrel (700).

17. A vertical heat exchanger installed within a natural thermal energy body (1000) as claimed in claim 1, further comprising a backflow fluid outlet (702') and backflow fluid piping (750) connected to upstream fluid piping or a fluid source (900) to provide a semi-closed circuit system with a thermal energy adjustment function, wherein if the backflow fluid outlet (702') is an upper part of the relay storage barrel (700), the vertical heat exchanger further includes a flow guiding structure (730') installed in the relay storage barrel (700) for guiding the flow of internal fluid to flow from top to bottom and, if the backflow fluid outlet (702') is at a lower part of the relay storage barrel (700), the flow guiding structure (730') is omitted.

18. A vertical heat exchanger installed within a natural thermal energy body (1000) as claimed in claim 17, further comprising a pump (714) installed in series between the backflow fluid outlet (702') and the upstream fluid piping or fluid source (900), said pump (714) being manually controlled or controlled by a control device (2000) to pump part of the water from the external tap water source or river, lake, or sea in the relay storage barrel (700) upstream through the backflow piping (750) to provide said semi-closed circuit system with a thermal energy adjustment function.

19. A vertical heat exchanger installed within a natural thermal energy body (1000) as claimed in claim 1, wherein at least one secondary segment storage facility (850) is further installed at a position higher than that of the relay storage barrel (700) for storing the water from the external tap water source or river, lake, or sea pumped by a pump (704) from the relay storage barrel (700) through a storage facility fluid piping (810).

20. A vertical heat exchanger installed within a natural thermal energy body (1000) as claimed in claim 1, wherein said at least one secondary segment storage facility (850) includes at least one of a fluid port (723) for enabling external fluid flow at a bottom of the at least one fluid terminal storage facility (850), ventilation piping (720) installed at a top of the at least one fluid terminal storage facility (850), and a ventilation switch valve (725) installed at a top of the at least one fluid terminal storage facility (850).

21. A vertical heat exchanger installed within a natural thermal energy body (1000) as claimed in claim 19, wherein the at least one secondary segment storage facility (850) is installed at a location higher than that of the relay storage barrel (700) and further connected to the relay storage barrel (700) by an auxiliary storage facility fluid piping (820).

22. A vertical heat exchanger installed within a natural thermal energy body (1000) as claimed in claim 1, further comprising at least one air conditioner cooling tower (1200) having a high temperature thermal exchange fluid inlet (1201) connected to an air conditioner (1500) by a first auxiliary fluid piping (830), said at least one air conditioner cooling tower including a cooling thermal exchange fluid outlet (1202) connected to the second fluid inlet (708) of the heat exchanger (705) by second auxiliary fluid piping (820), and the second fluid outlet (709) of the heat exchanger (705) connected to an inlet of the air conditioner (1500) to form a closed circuit for circulation of the thermal exchange fluid through the air conditioner (1500) and air conditioner cooling tower (1200).

23. A vertical heat exchanger installed within a natural thermal energy body (1000) as claimed in claim 22, further comprising a flow guiding structure (730) installed in the relay storage barrel (700) for guiding the flow of internal fluid to flow from a bottom of the relay storage barrel (700) to the air conditioner (1500), and a pump (724) for pumping said thermal exchange fluid from the air conditioner (1500) through the first auxiliary piping (830) to the at least one cooling tower (1200) and from the auxiliary storage facility fluid piping (820) through said first fluid inlet (701) back to the relay storage barrel (700), the pump (724) and the ventilation switch valve (725) being controlled by a control device (2000), and wherein as a result of the flow guiding structure extending to a bottom of the relay storage barrel (700), the thermal exchange fluid is pumped to the air conditioner (1500) through the flow guiding structure (730) from the bottom of the relay storage barrel (700), thereby causing the thermal exchange fluid to be drawn to the interior of the relay storage barrel (700) to form a closed circuit.

24. A vertical heat exchanger installed within a natural thermal energy body (1000) as claimed in claim 1, wherein the relay storage barrel (700) is situated in an external conduit (3000) having an internal diameter equal to or larger than an external diameter of the relay storage barrel (700), said external conduit being made of a thermally conductive material and in direct contact with the relay storage barrel (700) or in contact with a conductive material filling a space between the relay storage barrel (700) and the external conduit (3000).

25. A vertical heat exchanger installed within a natural thermal energy body (1000) as claimed in claim 1, wherein:
the relay storage barrel (700) has a step-shaped structure with at least two steps, the step-shaped structure having at least a top portion and a bottom portion, the top portion having a larger cross-sectional area than the bottom portion in a plane perpendicular to an axis of the relay storage barrel (700),
at least a section of the top portion extends out of the natural thermal energy body (1000), and
the section of the top portion that extends out of the natural thermal energy body (1000) is insulated by a heat insulation member (760).

26. A vertical heat exchanger installed within a natural thermal energy body (1000) as claimed in claim 25, wherein the top portion of the relay storage barrel (700) has one of the following configurations:
a. the top portion extends only partly out of the natural thermal body (1000);
b. the top portion extends entirely out of the natural thermal body (1000) and rests on a surface of the natural thermal body (1000); and
c. the top portion extends entirely above the surface of the natural body (1000) and is supported by a gantry (1100) while the bottom portion extends downwardly into the natural thermal body.

27. A vertical heat exchanger installed within a natural thermal energy body (1000) as claimed in claim 1, wherein:
the relay storage barrel (700) has one of a conical, tapered, trapezoidal cone-shaped, and trapezoidal polyhedral structure including a top portion and a bottom portion, the top portion having a larger cross-sectional area than the bottom portion in a plane perpendicular to an axis of the relay storage barrel (700),
the top portion extends out of the natural thermal energy body (1000), and
the portion is insulated by a heat insulation member (760).

28. A vertical heat exchanger installed within a natural thermal energy body (1000) as claimed in claim 23, further comprising a ventilation switch valve (725) to eliminate a negative pressure caused by pumping the water from the external tap water source or river, lake, or sea out of the relay storage barrel (700), said ventilation switch valve (725) being controlled by said control device (2000).

29. A vertical heat exchanger installed within a natural thermal energy body (1000) as claimed in claim 22, further comprising a ventilation switch valve (725) to eliminate a negative pressure caused by pumping the water from the external tap water source or river, lake, or sea out of the relay storage barrel (700), said ventilation switch valve (725) being controlled by a control device (2000).

30. A vertical heat exchanger installed within a natural thermal energy body (1000) as claimed in claim 1, wherein said thermal exchange fluid is in a liquid state.

31. A vertical heat exchanger installed within a natural thermal energy body (1000) as claimed in claim 24, wherein:
the relay storage barrel (700) has a step-shaped structure with at least two steps, the step-shaped structure having at least a top portion and a bottom portion, the top portion having a larger cross-sectional area than the bottom portion in a plane perpendicular to an axis of the relay storage barrel (700),
at least a section of the top portion extends out of the natural thermal energy body (1000), and
the section of the top portion that extends out of the natural thermal energy body (1000) is insulated by a heat insulation member (760).

32. A vertical heat exchanger installed within a natural thermal energy body (1000) as claimed in claim 31, wherein the top portion of the relay storage barrel (700) has one of the following configurations:
a. the top portion extends only partly out of the natural thermal body (1000);
b. the top portion extends entirely out of the natural thermal body (1000) and rests on a surface of the natural thermal body (1000); and
c. the top portion extends entirely above the surface of the natural body (1000) and is supported by a gantry (1100) while the bottom portion extends downwardly into the natural thermal body.

33. A vertical heat exchanger installed within a natural thermal energy body (1000) as claimed in claim 24, wherein:
the relay storage barrel (700) has one of a conical, tapered, trapezoidal cone-shaped, and trapezoidal polyhedral structure including a top portion and a bottom portion, the top portion having a larger cross-sectional area than the bottom portion in a plane perpendicular to an axis of the relay storage barrel (700),
the top portion extends out of the natural thermal energy body (1000), and
the portion is insulated by a heat insulation member (760).

* * * * *